(12) United States Patent
Omichi

(10) Patent No.: US 7,505,212 B2
(45) Date of Patent: Mar. 17, 2009

(54) ZOOM LENS AND IMAGE PICK-UP APPARATUS

(75) Inventor: Hiroshi Omichi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/984,900

(22) Filed: Nov. 26, 2007

(65) Prior Publication Data

US 2008/0137218 A1  Jun. 12, 2008

(30) Foreign Application Priority Data

Dec. 6, 2006  (JP) .............................. 2006-329753

(51) Int. Cl.
 *G02B 15/14* (2006.01)
(52) U.S. Cl. ...................... 359/683; 359/676
(58) Field of Classification Search .................. 359/676, 359/683, 684
 See application file for complete search history.

(56) References Cited

U.S. PATENT DOCUMENTS

| 6,094,312 A * | 7/2000 | Nakayama ................... 359/676 |
| 2008/0106790 A1 * | 5/2008 | Yamada et al. ............... 359/557 |

FOREIGN PATENT DOCUMENTS

| JP | 04-013109 A | 1/1992 |
| JP | 04-060509 | 2/1992 |
| JP | 05-224125 | 9/1993 |
| JP | 2000-121938 | 4/2000 |
| JP | 2000-121941 | 4/2000 |
| JP | 2002-365539 | 12/2002 |
| JP | 2003-202500 | 7/2003 |
| JP | 2005-084283 | 3/2005 |
| JP | 2005-091465 | 4/2005 |
| JP | 2006-071993 | 3/2006 |
| JP | 2006-251037 | 9/2006 |

\* cited by examiner

*Primary Examiner*—Scott J Sugarman
(74) *Attorney, Agent, or Firm*—Rader Fishman & Grauer PLLC; Ronald P. Kananen

(57) ABSTRACT

A zoom lens having a plurality of lens groups which performs zooming by changing distances between groups includes a reflective member to bend an optical axis which passes through the plurality of the lens groups. The plurality of lens groups includes, in order from an object side to an image plane side: a first lens group having a positive refractive power and fixed in position; a second lens group having a negative refractive power and to be moved along the optical axis direction when zooming; a third lens group having a positive refractive power and fixed in position; a fourth lens group having a positive refractive power and to be moved in the optical axis direction to compensate a position change of the image plane when zooming and focusing; and a fifth lens group having a negative refractive power and fixed in position when zooming. A ratio of the focal distance of the third lens group and the focal distance of the whole lens system is in a range of 3.4 to 4.0.

9 Claims, 13 Drawing Sheets

ZOOM LENS AND IMAGE PICK-UP APPARATUS

BACKGROUND OF THE INVENTION

1. Field of the Invention

The present invention relates to a zoom lens and an image pick-up apparatus. In particular, the present invention relates to a zoom lens and an image pick-up apparatus using the same, which are suitable for an image pick-up optical system for digital input/output devices, such as a digital still camera, a digital video camera, etc., and which are compact and have a high zooming ratio.

2. Description of Related Art

In recent years, the image pick-up apparatus using a solid-state imaging device, such as a digital still camera etc., has been spreading. As such a digital still camera spreads, there is a need for higher definition. Particularly, in the digital still camera with many pixels etc., there is a need for a lens (especially the zoom lens) for image pick-up excellent in an image forming performance corresponding to the solid-state imaging device with many pixels. Further, there is a strong need for miniaturization, and there is a demand for a small and highly efficient zoom lens. Furthermore, in order to make a camera thinner, some cameras are proposed in which the optical system is bent or folded by inserting a prism between lenses, to attain the thinning (reduction in incidence optical axis direction).

As for such a zoom lens, there is a demand for reduction in overall dimensions as well as the thinning of the lens system in addition to a demand for a higher zooming ratio, as a recent trend.

Examples of a zoom lens in which a prism is inserted between lenses and to attain the thinning are described in Japanese Patent Application Publication (KOKAI) No. 2005-84283, Japanese Patent Application Publication (KOKAI) No. 2005-91465 and Japanese Patent Application Publication (KOKAI) No. 2006-71993.

SUMMARY OF THE INVENTION

However, the zoom lenses as described in Japanese Patent Application Publication (KOKAI) No. 2005-84283, Japanese Patent Application Publication (KOKAI) No. 2005-91465 and Japanese Patent Application Publication (KOKAI) No. 2006-71993 only provide a zoom ratio of approximately 3 times to 5 times.

Accordingly, it is desirable to provide a zoom lens and an image pick-up apparatus using the zoom lens which has a high zooming ratio exceeding 8 times and can be reduced in overall length. The present invention is made in view of the above.

A zoom lens according to an embodiment of the present invention is a zoom lens having a plurality of lens groups which performs zooming by changing distances between groups. The zoom lens includes a reflective member to bend an optical axis which passes through the plurality of the lens groups. The plurality of lens groups includes, in order from an object side to an image plane side: a first lens group having a positive refractive power and fixed in position; a second lens group having a negative refractive power and to be moved along the optical axis direction when zooming; a third lens group having a positive refractive power and fixed in position; a fourth lens group having a positive refractive power and to be moved in the optical axis direction to compensate a position change of the image plane when zooming and focusing; and a fifth lens group having a negative refractive power and fixed in position when zooming. The zoom lens satisfies the following conditional expression (1).

$$3.4 < f3/fw < 4.0 \tag{1}$$

where f3: focal distance of the third lens group; and fw: focal distance at a maximum wide angle state of the whole lens system An image pick-up apparatus having a zoom lens and an imaging device converting an optical image formed by the zoom lens into an electric signal, in which the zoom lens is a zoom lens having a plurality of lens groups which performs zooming by changing distances between groups. The zoom lens includes a reflective member to bend an optical axis which passes through the plurality of the lens groups. The plurality of lens groups includes, in order from an object side to an image plane side: a first lens group having a positive refractive power and fixed in position; a second lens group having a negative refractive power and to be moved along the optical axis direction when zooming; a third lens group having a positive refractive power and fixed in position; a fourth lens group having a positive refractive power and to be moved in the optical axis direction to compensate a position change of the image plane when zooming and focusing; and a fifth lens group having a negative refractive power and fixed in position when zooming. The zoom lens satisfies the following conditional expression (1).

$$3.4 < f3/fw < 4.0 \tag{1}$$

where f3: focal distance of the third lens group; and fw: focal distance at a maximum wide angle state of the whole lens system According to the present invention, it is possible to shorten the overall length, even with the high zooming ratio exceeding 8 times.

DETAILED DESCRIPTION OF EMBODIMENTS

Figure 1:
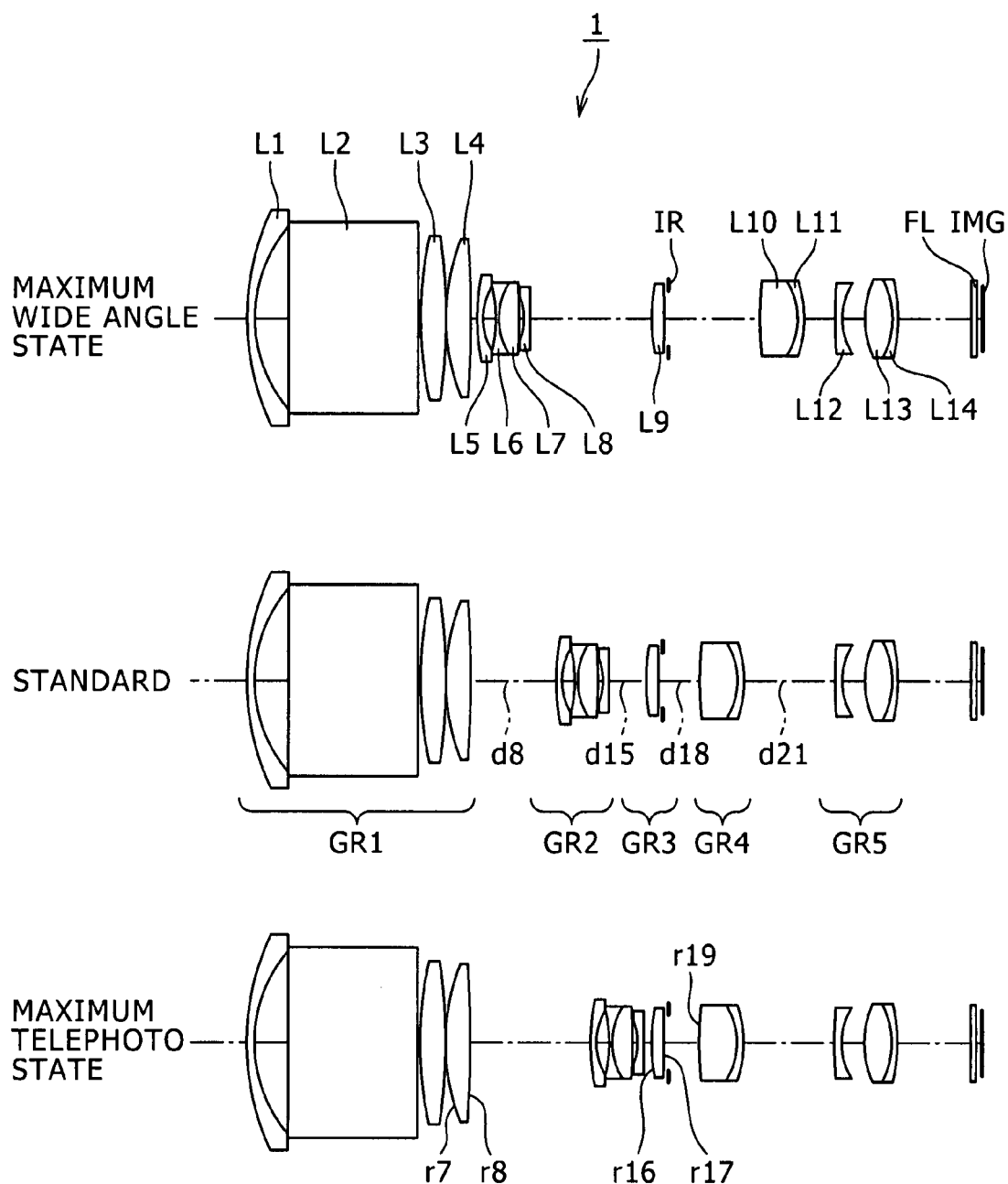
FIG. 1 is a view showing a lens arrangement of a first embodiment of a zoom lens in accordance with the present invention.

Hereafter, embodiments of a zoom lens and an image pick-up apparatus according to the present invention will be described.

A zoom lens in accordance with an embodiment of the present invention is a zoom lens having a plurality of lens groups which performs zooming by changing a distance between groups, including a reflective member for bending an optical axis which passes through a plurality of the above-mentioned lens groups. The plurality of lens group includes, in order from an object side to an image plane side: a first lens group having a positive refractive power and fixed in position; a second lens group having a negative refractive power and to be moved along an optical axis direction when zooming; a third lens group having a positive refractive power and fixed in position; a fourth lens group having a positive refractive power and to be moved in an optical axis direction to compensate for variations of an image plane position when zooming and focusing; and a fifth lens group having a negative refractive power and fixed in position when zooming. The zoom lens satisfies the following conditional expression (1).

$$3.4 < f3/fw < 4.0 \tag{1}$$

where f3: focal distance of third lens group; and fw: focal distance at the maximum wide angle of the whole lens system.

The conditional expression (1) is a conditional expression which specifies the focal distance of the third lens group.

It becomes difficult to obtain the zooming ratio of 8 times or more, if the value is less than a lower limit value of the conditional expression (1). When trying to obtain the zooming ratio of 8 times or more, the power of the second lens group increases and the Petzval sum becomes large on a negative side, resulting in over-compensation. On the contrary, an overall length becomes long if the value exceeds an upper limit value of the conditional expression (1).

In a zoom lens in accordance with an embodiment of the present invention, the fifth lens group may include at least one lens, at least one surface of which is an aspheric surface and which has a negative refractive power, thus preventing an image plane curvature from being excessive.

In a zoom lens in accordance with an embodiment of the present invention, the reflective member may be included in the first lens group, whereby the thinning or reduction of length in an incidence optical axis direction can be attained.

In a zoom lens in accordance with an embodiment of the present invention, the reflective member included in the first group may be a rectangular prism having a refractive index of 1.9 or more. Accordingly, a substantial optical path length between a front lens and a lens on an image side of the reflective member can be increased and a diameter of the front lens can be reduced.

In a zoom lens in accordance with an embodiment of the present invention, the first lens group may have at least two lenses having positive refractive powers on the image side of the reflective member, and satisfies the following conditional expression (2).

$$Vave > 60 \tag{2}$$

where

Vave: the average value of Abbe numbers of two lenses having positive refractive power in the first lens group.

If the zoom ratio is increased to a high ratio of approximately 10 times in a bent optical system, i.e., an optical system provided with the reflective member for bending the optical axis which passes through a plurality of lens groups, it is necessary to increase a size of the first lens group, especially the diameter of the front lens, in order to keep an F number at a maximum telephoto state small (bright). However, it is possible to increase the power of the first lens group and prevent the first lens group from increasing in size by arranging a prism with a high refractive index in the first lens group and arranging two positive lenses on an image side of the prism. Furthermore, a spherical aberration generated due to the increased power of the first lens group can be controlled by arranging two positive lenses.

It should be noted that, in order to ensure the above-described effect, the first lens group may include, in order from the object side to the image side, a negative meniscus lens whose convex surface faces towards the object side, a rectangular prism having a refractive index of 1.9 or more, and two positive lenses in a biconvex shape. Furthermore, at least one of the two positive lenses may have an aspheric surface lens.

The conditional expression (2) specifies the Abbe number average value of two lenses having the positive refractive powers in the first lens group. If the value of the conditional expression (2) is less than 60, an axis chromatic aberration on the telephoto side becomes large, making it difficult to attain the high zooming ratio.

It is desirable that the zoom lens in accordance with an embodiment of the present invention satisfies the following conditional expression (3).

$$3.4 < f1/fw < 4.0 \tag{3}$$

where f1: focal distance of the first lens group.

The conditional expression (3) is a conditional expression which specifies the focal distance of the first lens group. If the value is less than a lower limit value of the conditional expression (3), the power of the first lens group increases and the Petzval sum becomes large on the positive side, resulting in over-compensation. On the other hand, the diameter of the first lens group becomes large, if the value exceeds the upper limit value of the conditional expression (3).

In a zoom lens in accordance with an embodiment of the present invention, the fifth lens group may be constructed with a front group having a negative refractive power and a rear group having a positive refractive power. The rear group having a positive refractive power or a part of the rear group (hereafter referred to as "camera-shake correction lens group") may be moved in a direction perpendicular to the optical axis to shift an image.

Since the fifth lens group that is the last lens group includes the front group having the negative refractive power and the rear group having a positive refractive power, the front group bends up rays of light at once, and the rear group forms telecentric rays. Accordingly, the diameter of the first lens group, especially the lens closest to the object side (i.e., the front lens) can be reduced and the miniaturization of the whole zoom lens is attained.

Further, a camera-shake correction lens group is arranged at the rearmost end, to thereby allow the reduction in size and the number of lenses. In other words, since the camera-shake correction lens group is arranged at the rearmost end, there is no interference with a movable group (for example, the second lens group, the fourth lens group). If a drive mechanism for the camera-shake correction lens group is provided, an outer diameter does not necessary to be enlarged in the section. When the lens group is moved in the direction orthogonal to the optical axis in order to perform the camera-shake correction, aberration variations, especially variations in distortion aberration may become an issue, and it is required to increase the number of lenses to compensate for the variations. However, in the case of this embodiment, the lens group at a section where rays of light are telecentric is moved in the direction orthogonal to the optical axis and performs the camera-shake correction. Therefore, it is possible to maintain a high optical power with little aberration variation without increasing the number of lenses.

On the other hand, the rays of light are raised sharply by the front group at once, so that the image plane curvature would becomes excessive. Thus, it is desirable that the fifth lens group includes at least one lens, at least one surface of which is an aspheric surface and which has a negative refractive power, to thereby prevent the image plane curvature from being excessive. More specifically, the image plane curvature may be reduced by making the surface whose concave surface faces towards the image plane side of a negative lens aspheric. Further, the aspheric surface is formed such that its curvature becomes smaller than a paraxis curvature radius as it comes away from the optical axis.

The rear group which serves as the camera-shake correction lens group includes a cemented lens of a positive lens in a biconvex shape and a negative meniscus lens whose convex surface faces toward the image side, to satisfy the following conditional expressions (4), assuming that βa is a magnification of the camera-shake correction lens group and βb is a magnification of the lens group closer to the image plane side than the camera-shake correction lens group.

$$0.5 < (1-1a) \times \beta b < 0.8 \tag{4}$$

The conditional expression (4) is a conditional expression for specifying a ratio, with which an image shifts in response to an amount of movement of the camera-shake correction lens group. If the value is less than the lower limit value of the conditional expression (4), the amount of movement (shift) of the camera-shake correction lens group required for shifting the image by a predetermined amount becomes large and it becomes difficult to compensate for the aberration. As a result, a drive system becomes too large and may prevent the miniaturization. When the value exceeds the upper limit value of the conditional expression (4), the image shifts greatly even if the camera-shake correction lens group moves a little. As a result, highly accurate control is required, and then highly precise control is also required with respect to component accuracy and assembly accuracy as well as a detection system or the drive system, leading to considerably high costs.

In the zoom lens in accordance with an embodiment of the present invention, the fifth lens group may be constructed with a front group having a negative refractive power and a rear group having a positive refractive power, and the front group may serve as a centering lens at the time of manufacture. Since the front group produces large image plane variations, without producing a coma aberration when it is shifted in the direction perpendicular to the optical axis, it is suitable for compensating for an image plane difference (partial blurring) of each quadrant. Such an construction allows manufacture of an anti-vibration zoom lens having stable image pickup performance. Further, a balance between compensations for the image plane difference (partial blurring) of each quadrant due to centering at the time of manufacture and other aberration variations such as the coma aberration, can be kept appropriately by making the negative lens in the front group into an aspheric surface shape.

Next, another embodiment of the zoom lens in accordance with the present invention and a numerical example in which certain numerical values are applied to the embodiment will be described with reference to the drawings and tables.

It should be noted that aspheric surfaces are introduced in each embodiment, and the shape of aspheric surfaces shall be defined by the following equation 1.

$$Z = \frac{C \cdot H^2}{1 + \sqrt{1 - (1+K) \cdot C^2 \cdot H^2}} + \sum (A_{2i} \cdot H^{2i}) \qquad \text{[Equation 1]}$$

where "Z" is a distance between a tangent plane at an aspheric surface vertex and a surface of sphere in the optical axis direction, where "H" $(=\sqrt{(X^2+Y^2)})$ is a height from the optical axis, "C" is a curvature (1/r) of the aspheric surface vertex, "K" is a cone constant, and "A2i" is the 2i-th aspheric surface coefficient.

FIG. 1 shows a lens arrangement of a zoom lens 1 in accordance with a first embodiment of the present invention, in which an upper part shows the maximum wide angle state, a middle part shows an intermediate focal distance state between the maximum wide angle state and the maximum telephoto state, and a lower part shows the maximum telephoto state.

The zoom lens 1 is constructed by arranging, in order from an object side to an image plane side, a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power. When zooming from the maximum wide angle to the maximum telephoto state, the first lens group GR1 is fixed in the optical axis direction, the second lens group GR2 is moved in the optical axis direction such that the distance from the first lens group GR1 increases, the third lens group GR3 is fixed in the optical axis direction, the fourth lens group GR4 is moved in the optical axis direction for focusing and compensating for shifting of the image plane position at the time of zooming, and the fifth lens group GR5 is fixed in the optical axis direction.

In the zoom lens 1, the first lens group GR1 includes a negative meniscus lens L1 whose convex surface faces towards the object side, a rectangular prism L2, a positive lens L3 in a biconvex shape, and a positive lens L4 in a biconvex shape both of whose surfaces are formed to be aspheric surfaces, the lenses being arranged in order from the object side to the image plane side. The second lens group GR2 includes a negative meniscus lens L5 whose convex surface faces towards the object side, a negative cemented lens of a biconcave lens L6 and a biconvex lens L7, and a negative meniscus lens L8 whose concave surface faces towards the object side, the lenses being arranged in order from the object side to the image plane side. The third lens group GR3 includes one lens L9 having a positive refractive power, both of whose surfaces are formed to be aspheric surfaces. The fourth lens group GR4 includes a positive cemented lens of a positive biconvex lens L10 whose object side surface is formed to be an aspheric surface and a negative meniscus lens L11 whose convex surface faces towards the image plane side, the lenses being arranged in order from the object side to the image plane side. The fifth lens group GR5 includes a negative meniscus lens L12 whose convex surface faces towards the object side and a positive cemented lens of a biconvex lens L13 and a negative meniscus lens L14 whose convex surface faces towards the image plane side, the lenses being arranged in order from the object side to the plane side. The negative meniscus lens L12 in the fifth lens group GR5 constitutes the front group having a negative refractive power, and the positive cemented lens constructed with the lenses L13 and L14 constitutes the rear group having a positive refractive power, and can shift the image by moving the rear group in the direction orthogonal to the optical axis. It should be noted that an aperture diaphragm IR is arranged in close proximity with the image plane side of the third lens group GR3, and is fixed in the optical axis direction at the time of zooming. Further, a filter FL, such as an infrared ray cut filter, a lowpass filter, etc., is arranged between the fifth lens group GR5 and an image plane IMG.

The lens data of First Numerical Example in which the specific values are applied to the zoom lens 1 in accordance with the first embodiment are shown in Table 1. It should be noted that, in Table 1 and other tables showing the lens data, "i" indicates the i-th surface number counting from the object side, "ri" shows a curvature radius of the i-th surface-counting from the object side, "di" indicates an axial surface distance between the i-th surface and the i+1-th surface counting from the object side, "ni" shows a refractive index with respect to d-line (wavelength of 587.6 nm) of the i-th surface counting from the object side, and "vi" indicates an Abbe number with respect to the d-line of the i-th surface counting from the object side. Further, with respect to "ri", "INF" means that the relevant surface is a flat plane, and with respect to "di", "variable" means that the relevant surface distance is a variable distance.

TABLE 1

| i | ri | di | ni | vi |
|---|------|--------|---------|------|
| 1 | 4.960 | 0.149 | 1.92286 | 20.9 |
| 2 | 2.749 | 0.638 | | |
| 3 | INF | 2.553 | 1.90366 | 31.3 |
| 4 | INF | 0.064 | | |
| 5 | 7.082 | 0.487 | 1.49700 | 81.6 |
| 6 | −6.634 | 0.021 | | |
| 7 | 3.781 | 0.473 | 1.58313 | 59.5 |
| 8 | −16.538 | variable | | |
| 9 | 4.495 | 0.092 | 1.90366 | 31.3 |
| 10 | 1.413 | 0.238 | | |
| 11 | −2.853 | 0.092 | 1.88300 | 40.8 |
| 12 | 1.247 | 0.369 | 1.92286 | 20.9 |
| 13 | −4.784 | 0.099 | | |
| 14 | −1.702 | 0.117 | 1.88300 | 40.8 |
| 15 | −15.104 | variable | | |
| 16 | 3.257 | 0.255 | 1.58313 | 59.5 |
| 17 | −5.208 | 0.043 | | |
| 18 | INF | variable | | |
| 19 | 4.903 | 0.745 | 1.74330 | 49.3 |
| 20 | −1.366 | 0.093 | 1.84666 | 23.8 |
| 21 | −2.991 | variable | | |
| 22 | 4.850 | 0.142 | 1.88300 | 40.8 |
| 23 | 1.400 | 0.450 | | |
| 24 | 1.824 | 0.532 | 1.48749 | 70.4 |
| 25 | −1.789 | 0.106 | 1.90366 | 31.3 |
| 26 | −3.027 | 1.474 | | |
| 27 | INF | 0.064 | 1.51680 | 64.2 |
| 28 | INF | 0.130 | | |

A distance d8 between the first lens group GR1 and the second lens group GR2, a distance d15 between the second lens group GR2 and the third lens group GR3, a distance d18 between the third lens group GR3 (aperture diaphragm IR) and the fourth lens group GR4, and a distance d21 between the fourth lens group GR4 and the fifth lens group GR5 change when zooming from the maximum wide angle to the maximum telephoto state. These distances in the maximum wide angle state (f=1.00), the intermediate focal distance state (f=2.83), and the maximum telephoto state (f=8.00) in First Numerical Example are shown in Table 2 together with a focal distance "f".

TABLE 2

| | f | | |
|---|---|---|---|
| | 1.00 | 2.83 | 8.00 |
| d8 | 0.18 | 1.53 | 2.51 |
| d15 | 2.44 | 1.09 | 0.10 |
| d18 | 1.81 | 1.01 | 0.91 |
| d21 | 0.62 | 1.41 | 1.52 |

Both surfaces (r7, r8) of the positive lens L4, both surfaces (r16, r17) of the positive lens L9, and an object side surface (r19) of the positive lens L10 are aspheric. The fourth order, sixth order, eighth order, and tenth order aspheric surface coefficients A4, A6, A8, and A10 of each of the surfaces in First Numerical Example are shown in Table 3. It should be noted that, in Table 3 and tables showing the following aspheric surface coefficients, "E-i" represents an exponential notation which uses 10 as a base, i.e., "$10^{-i}$", for example, "0.12345E-05" means "$0.12345 \times 10^{-5}$".

TABLE 3

| | A4 | A6 | A8 | A10 |
|---|---|---|---|---|
| r7 | −3.6379E−03 | −5.3977E−05 | 5.7176E−05 | −1.2429E−04 |
| r8 | −4.6112E−03 | 9.7309E−04 | −4.0828E−04 | −7.4809E−06 |
| r16 | 3.5085E−02 | 7.5915E−02 | 1.5412E−02 | 1.9809E−01 |
| r17 | 5.4517E−02 | 8.5396E−02 | −7.9666E−03 | 2.7214E−01 |
| r19 | −8.9039E−03 | 8.2134E−03 | −1.3386E−02 | 1.0768E−02 |

Values of the First Numerical Example corresponding to the conditional expressions (1) to (4) are shown in Table 4 together with a focal distance "f", F number "Fno", and half-angle of view "ω".

TABLE 4

| f | 1.00~8.00 |
|---|---|
| Fno | 3.35~3.95 |
| ω | 31.13~4.14 |
| f1/fw | 3.50 |
| Vave | 70.55 |
| f3/fw | 3.48 |
| $(1 − \beta a) \cdot \beta b$ | 0.64 |

Figure 2:
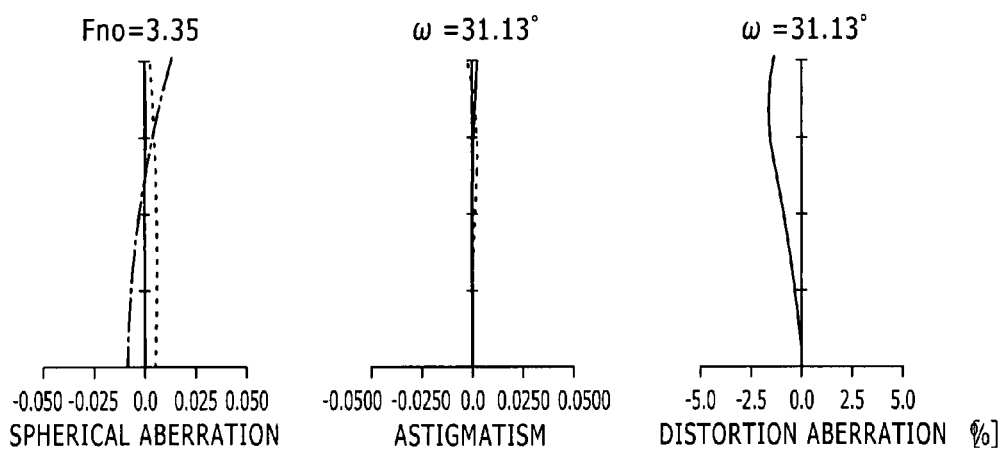
FIG. 2 shows aberration graphs of a First Numerical Example together with FIGS. 3 and 4, in which specific values are applied to the first embodiment, and shows a spherical aberration, astigmatism, and a distortion aberration in a maximum wide angle state.
Figure 3:
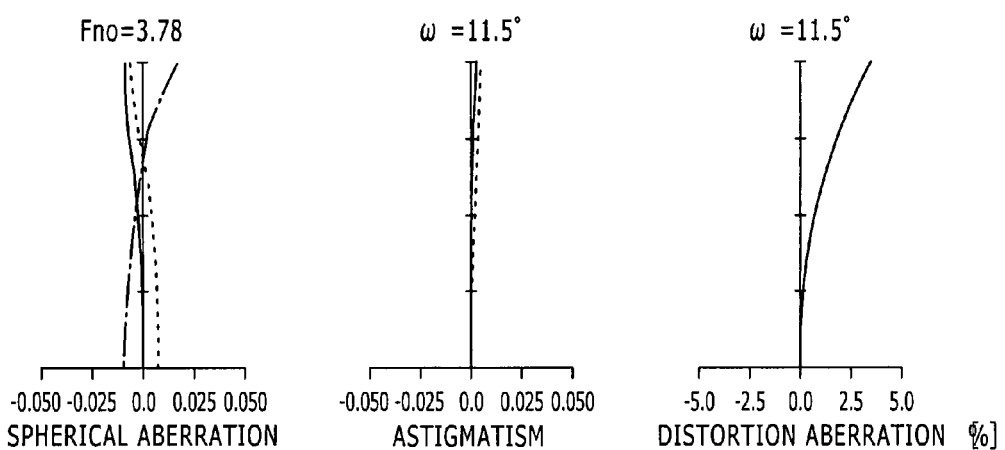
FIG. 3 shows a spherical aberration, astigmatism, and a distortion aberration in an intermediate focal distance state.
Figure 4:
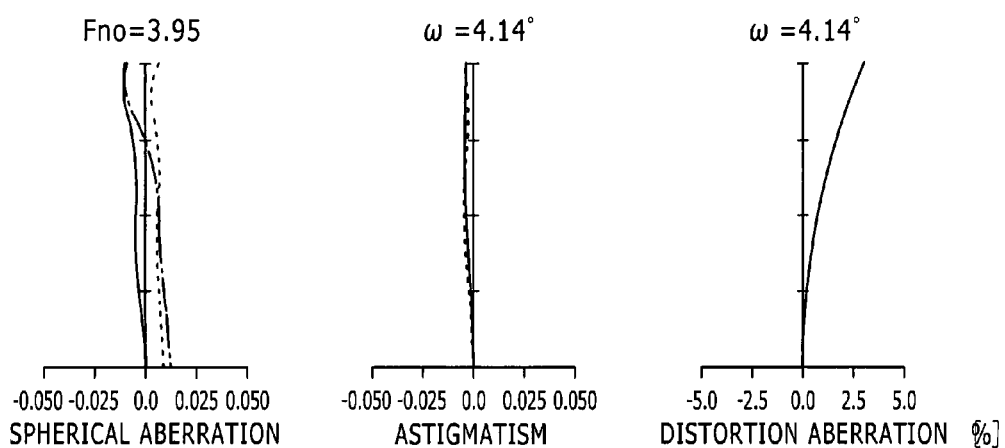
FIG. 4 shows a spherical aberration, astigmatism, and a distortion aberration in a maximum telephoto state.

FIGS. 2 to 4 are aberration graphs showing a spherical aberration astigmatism, and a distortion aberration of the First Numerical Example, respectively. FIGS. 2 to 4 respectively show aberration graphs in the maximum wide angle state, the intermediate focal distance state, and the maximum telephoto state. In the spherical aberration of the respective aberration graphs of FIGS. 2 to 4, a solid line, a broken line, and a dash-and-dot line indicate values for the d-line, C-line (wavelength of 656.3 nm), and g-line (wavelength of 435.8 nm), respectively. In the astigmatism graph and the distortion-aberration graph, values are shown for the d-line. Further, in the astigmatism graph, a solid line shows values in a sagittal image plane and a broken line shows values in a meridional image plane.

It is clear from each aberration graph that First Numerical Example has an excellent image forming performance.

Figure 5:
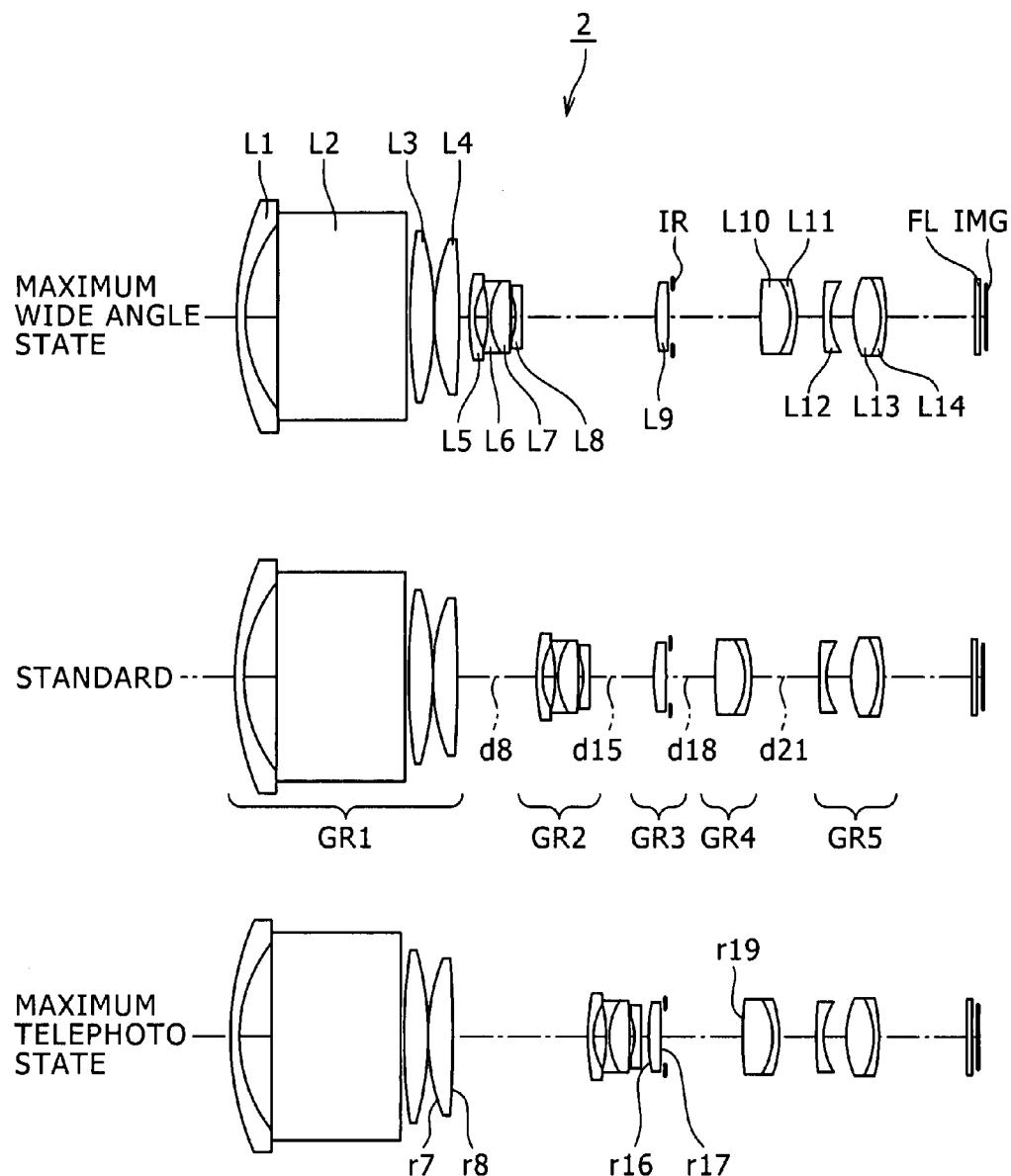
FIG. 5 is a view showing a lens arrangement of a second embodiment of the zoom lens in accordance with the present invention.

FIG. 5 shows a lens arrangement of a zoom lens 2 in accordance with a second embodiment of the present invention, in which an upper part shows the maximum wide angle state, a middle part shows an intermediate focal distance state between the maximum wide angle and the maximum telephoto state, and a lower part shows the maximum telephoto state.

The zoom lens 2 is constructed by arranging, in order from an object side to an image plane side, a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power. When zooming from the maximum wide angle to the maximum telephoto state, the first lens group GR1 is fixed in the optical axis direction, the second lens group GR2 is moved in the optical axis direction such that the distance from the first lens group GR1 increases, the third lens group GR3 is fixed in the optical axis direction, the fourth lens group GR4 is moved in the optical axis direction for focusing and compensating for shifting of the image plane position at the time of zooming, and the fifth lens group GR5 is fixed in the optical axis direction.

In the zoom lens 2, the first lens group GR1 includes a negative meniscus lens L1 whose convex surface faces towards the object side, a rectangular prism L2, a positive lens L3 in a biconvex shape, and a positive lens L4 in a biconvex shape both of whose surfaces are formed to be aspheric surfaces, the lenses being arranged in order from the object side to the image plane side. The second lens group GR2 includes a negative meniscus lens L5 whose convex surface faces towards the object side, a negative cemented lens of a biconcave lens L6 and a biconvex lens L7, and a negative meniscus lens L8 having a concave surface facing toward the object side, the lenses being arranged in order from the object side to the image plane side. The third lens group GR3 includes one lens L9 having a positive refractive power, both of whose surfaces are formed to be aspheric surfaces. The fourth lens group GR4 includes a positive cemented lens of a positive biconvex lens L10 whose object side surface is formed to be an aspheric surface and a negative meniscus lens L11 whose convex surface faces towards the image plane side, the lenses being arranged in order from the object side to the image plane side. The fifth lens group GR5 includes a negative meniscus lens L12 whose convex surface faces towards the object side and a positive cemented lens of a biconvex lens L13 and a negative meniscus lens L14 whose convex surface faces towards the image plane side, the lenses being arranged in order from the object side to the image plane side. The negative meniscus lens L12 in the fifth lens group GR5 constitutes the front group having a negative refractive power, and the positive cemented lens constructed with the lenses L13 and L14 constitutes the rear group having a positive refractive power, and can shift the image by moving the rear group in the direction orthogonal to the optical axis. It should be noted that an aperture diaphragm IR is arranged in close proximity with the image plane side of the third lens group GR3, and is fixed in the optical axis direction at the time of zooming. Further, a filter FL, such as an infrared-line cut filter, a lowpass filter, etc., is arranged between the fifth lens group GR5 and an image plane IMG.

The lens data of the Second Numerical Example in which the specific values are applied to the zoom lens 2 in accordance with the second embodiment are shown in Table 5.

TABLE 5

| i | ri | di | ni | νi |
|---|---|---|---|---|
| 1 | 6.013 | 0.213 | 1.92286 | 20.9 |
| 2 | 3.013 | 0.592 | | |

TABLE 5-continued

| i | ri | di | ni | vi |
|---|------|--------|--------|------|
| 3 | INF | 2.554 | 1.90366 | 31.3 |
| 4 | INF | 0.054 | | |
| 5 | 7.729 | 0.477 | 1.49700 | 81.6 |
| 6 | −6.125 | 0.021 | | |
| 7 | 3.559 | 0.466 | 1.58313 | 59.5 |
| 8 | −21.154 | variable | | |
| 9 | 5.785 | 0.092 | 1.90366 | 31.3 |
| 10 | 1.579 | 0.223 | | |
| 11 | −3.940 | 0.092 | 1.88300 | 40.8 |
| 12 | 1.064 | 0.390 | 1.92286 | 20.9 |
| 13 | −8.860 | 0.105 | | |
| 14 | −1.764 | 0.092 | 1.88300 | 40.8 |
| 15 | 128.577 | variable | | |
| 16 | 3.217 | 0.255 | 1.58313 | 59.5 |
| 17 | −5.993 | 0.043 | | |
| 18 | INF | variable | | |
| 19 | 4.956 | 0.611 | 1.74330 | 49.3 |
| 20 | −1.483 | 0.103 | 1.84666 | 23.8 |
| 21 | −3.191 | variable | | |
| 22 | 4.800 | 0.092 | 1.88300 | 40.8 |
| 23 | 1.465 | 0.511 | | |
| 24 | 2.056 | 0.532 | 1.48749 | 70.4 |
| 25 | −1.750 | 0.106 | 1.90366 | 31.3 |
| 26 | −2.875 | 1.768 | | |
| 27 | INF | 0.064 | 1.51680 | 64.2 |
| 28 | INF | 0.130 | | |

A distance d8 between the first lens group GR1 and the second lens group GR2, a distance d15 between the second lens group GR2 and the third lens group GR3, a distance d18 between the third lens group GR3 (aperture diaphragm IR) and the fourth lens group GR4, and a distance d21 between the fourth lens group GR4 and the fifth lens group GR5 change when zooming from the maximum wide angle to the maximum telephoto state. These distances in the maximum wide angle state (f=1.00), the intermediate focal distance state (f=4.42), and the maximum telephoto state (f=10.03) in the Second Numerical Example are shown in Table 6 together with a focal distance "f".

TABLE 6

| | f | | |
|---|---|---|---|
| | 1.00 | 4.42 | 10.03 |
| d8 | 0.14 | 1.84 | 2.67 |
| d15 | 2.54 | 0.84 | 0.01 |
| d18 | 1.98 | 0.68 | 1.25 |
| d21 | 0.67 | 1.96 | 1.39 |

Both surfaces (r7, r8) of the positive lens L4, both surfaces (r16, r17) of the positive lens L9, and an object side surface (r19) of the positive lens L10 are aspheric. The fourth order, sixth order, eighth order, and tenth order aspheric surface coefficients A4, A6, A8, and A10 of each of the surfaces in Second Numerical Example are shown in Table 7.

TABLE 7

| | A4 | A6 | A8 | A10 |
|---|---|---|---|---|
| r7 | −3.0316E−03 | 2.4740E−04 | −6.2786E−06 | −2.0635E−04 |
| r8 | −3.4815E−03 | 1.3873E−03 | −7.4577E−04 | −6.0146E−06 |
| r16 | 5.2112E−02 | 1.1944E−01 | −2.9791E−02 | 2.5315E−01 |
| r17 | 7.1000E−02 | 1.3822E−01 | −6.8195E−02 | 3.6479E−01 |
| r19 | −6.8735E−03 | 1.0522E−02 | −2.2064E−02 | 2.0491E−02 |

Values of the Second Numerical Example corresponding to the conditional expressions (1) to (4) are shown in Table 8 together with the focal distance "f", F number "Fno", and half-angle of view "ω".

TABLE 8

| f | 1.00~10.03 |
|---|---|
| Fno | 3.52~4.91 |
| ω | 31.38~3.30 |
| f1/fw | 3.50 |
| Vave | 70.55 |
| f3/fw | 3.63 |
| $(1 - \beta a) \cdot \beta b$ | 0.68 |

Figure 6:
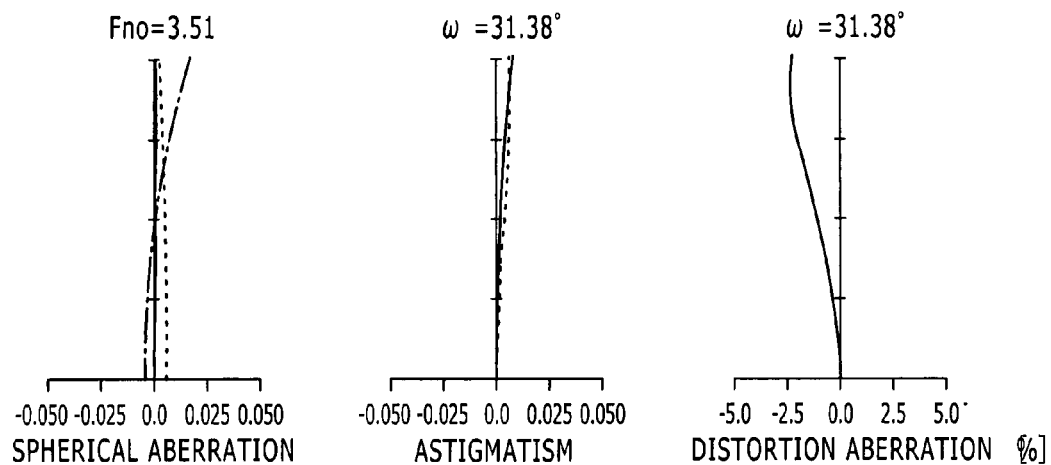
FIG. 6, together with FIGS. 7 and 8, is an aberration graph of a Second Numerical Example in which specific values are applied to the second embodiment, and shows a spherical aberration, astigmatism, and a distortion aberration in a maximum wide angle state.
Figure 7:
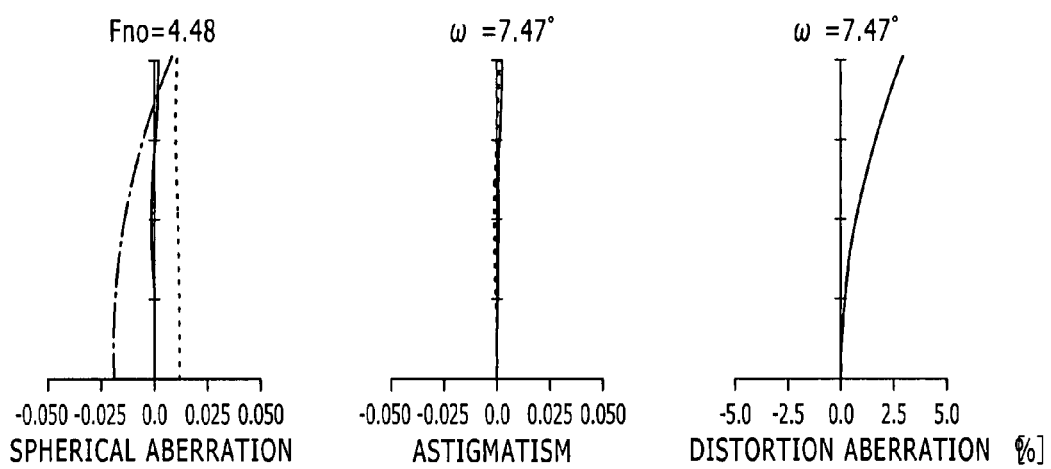
FIG. 7 shows a spherical aberration, astigmatism, and a distortion aberration in an intermediate focal distance state.
Figure 8:
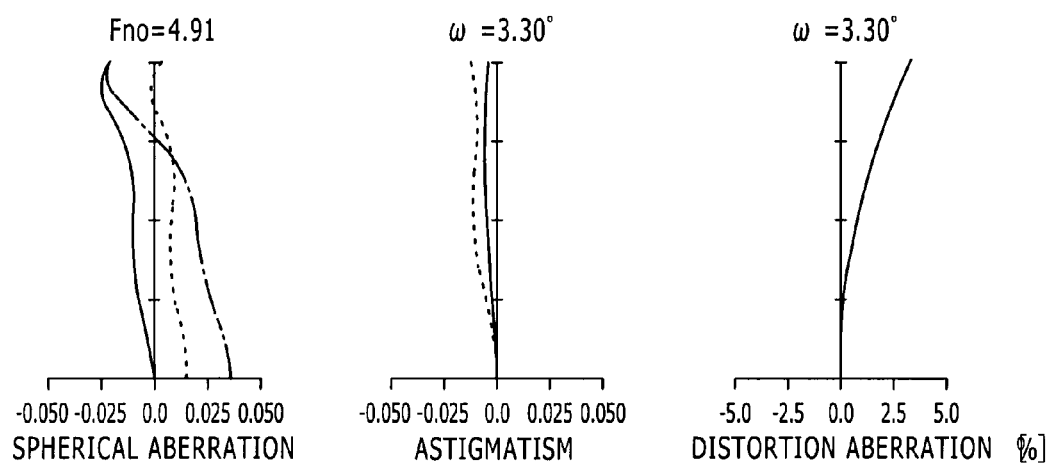
FIG. 8 shows a spherical aberration, astigmatism, and a distortion aberration in a maximum telephoto state.

FIGS. 6 to 8 are respectively aberration graphs showing a spherical aberration astigmatism, and a distortion aberration of the Second Numerical Example. FIGS. 6 to 8 respectively show aberration graphs in the maximum wide angle state, the intermediate focal distance state, and the maximum telephoto state. In the spherical aberration of the respective aberration graphs of FIGS. 6 to 8, a solid line, a broken line, and a dash-and-dot line indicate values for the d-line, C-line, and g-line respectively. In the astigmatism graph and the distortion aberration graph, values are shown for the d-line. Further, in the astigmatism graph, a solid line shows values in a sagittal image plane and a broken line shows values in a meridional image plane.

It is clear from each aberration graph that the Second Numerical Example has an excellent image forming performance.

Figure 9:
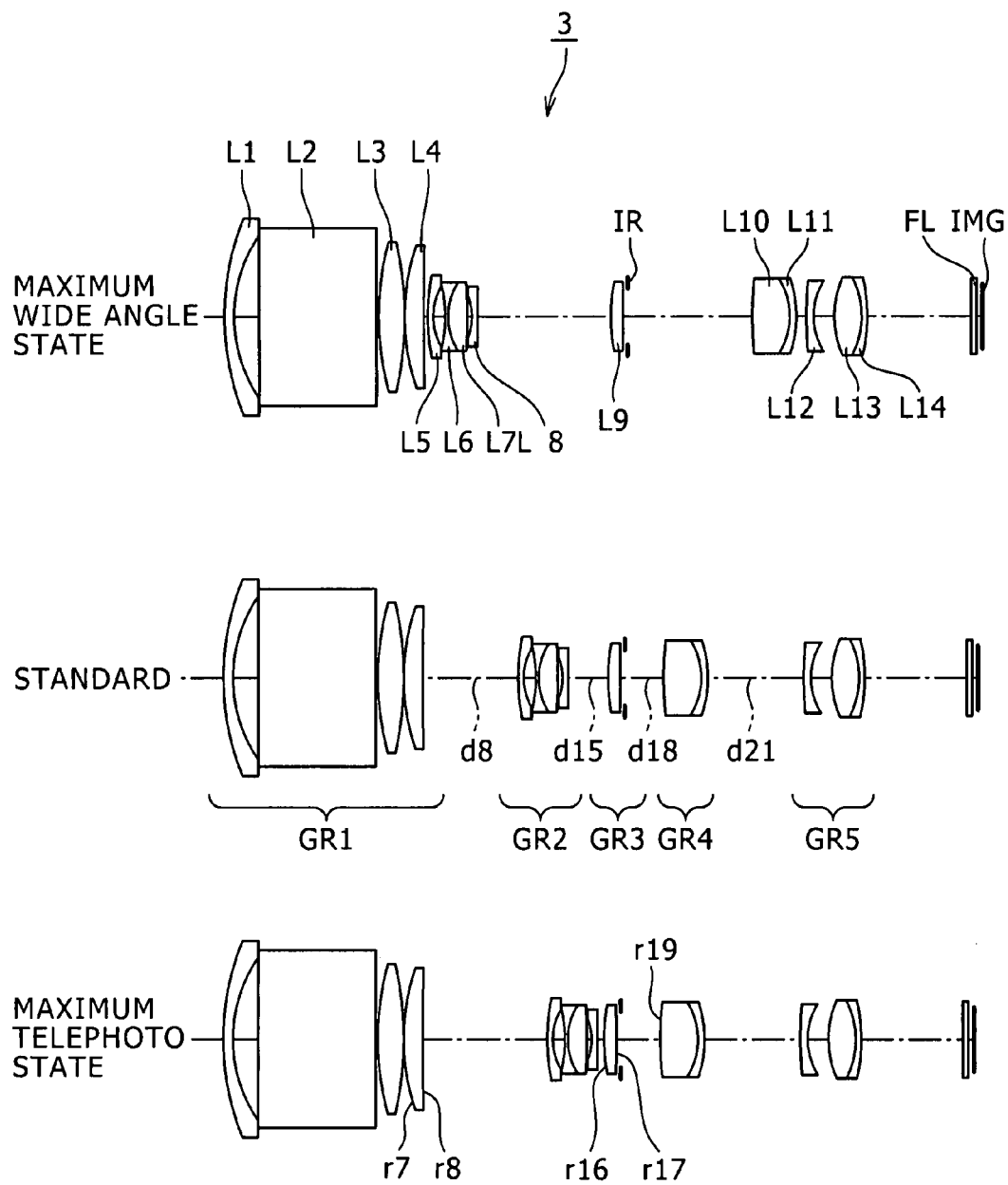
FIG. 9 is a view showing a lens arrangement of a third embodiment of the zoom lens in accordance with the present invention.

FIG. 9 shows a lens arrangement of a zoom lens 3 in accordance with a third embodiment of the present invention, in which an upper part shows the maximum wide angle state, a middle part shows an intermediate focal distance state between the maximum wide angle state and the maximum telephoto state, and a lower part shows the maximum telephoto state.

The zoom lens 3 is constructed by arranging, in order from an object side to an image plane side, a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power. When zooming from the maximum wide angle state to the maximum telephoto state, the first lens group GR1 is fixed in the optical axis direction, the second lens group GR2 is moved in the optical axis direction such that the distance from the first lens group GR1 increases, the third lens group GR3 is fixed in the optical axis direction, the fourth lens group GR4 is moved in the optical axis direction for focusing and compensating for shifting of the image plane position at the time of zooming, and the fifth lens group GR5 is fixed in the optical axis direction.

In the zoom lens 3, the first lens group GR1 includes a negative meniscus lens L1 whose convex surface faces towards the object side, a rectangular prism L2, a positive lens L3 in a biconvex shape, and a positive lens L4 in a biconvex shape both of whose surfaces are formed to be aspheric surfaces, the lenses being arranged in order from the object side to the image plane side. The second lens group GR2 includes a negative meniscus lens L5 whose convex surface faces towards the object side, a negative cemented lens of a biconcave lens L6 and a biconvex lens L7, and a negative meniscus lens L8 whose concave surface faces towards the object side, the lenses being arranged in order from the object side to the image plane side. The third lens group GR3 includes one lens L9 having a positive refractive power both of whose surfaces are formed to be aspheric surfaces. The fourth lens group GR4 includes a positive cemented lens of a positive biconvex lens L10 whose object side surface is formed to be an aspheric surface and a negative meniscus lens L11 whose convex surface faces towards the image plane side, the lenses being arranged in order from the object side to the image plane side. The fifth lens group GR5 includes a negative meniscus lens L12 whose convex surface faces towards the object side and a positive cemented lens of a biconvex lens L13 and a negative meniscus lens L14 whose convex surface faces towards the image plane side, the lenses being arranged in order from the object side to the image plane side. The negative meniscus lens L12 in the fifth lens group GR5 constitutes the front group having a negative refractive power, and the positive cemented lens constructed with the lenses L13 and L14 constitutes the rear group having a positive refractive power, and can shift the image by moving the rear group in the direction orthogonal to the optical axis. It should be noted that an aperture diaphragm IR is arranged in close proximity with the image plane side of the third lens group GR3, and is fixed in the optical axis direction at the time of zooming. Further, a filter FL, such as an infrared ray cut filter, a lowpass filter, etc., is arranged between the fifth lens group GR5 and an image plane IMG.

The lens data of the Third Numerical Example in which the specific values are applied to the zoom lens 3 in accordance with the third embodiment are shown in Table 9.

TABLE 9

| i | ri | di | ni | vi |
|---|---|---|---|---|
| 1 | 6.136 | 0.149 | 1.92286 | 20.9 |
| 2 | 3.166 | 0.531 | | |
| 3 | INF | 2.451 | 1.90366 | 31.3 |
| 4 | INF | 0.059 | | |
| 5 | 6.032 | 0.498 | 1.48749 | 70.4 |
| 6 | −6.559 | 0.021 | | |
| 7 | 4.004 | 0.413 | 1.58313 | 59.5 |
| 8 | −41.489 | variable | | |
| 9 | 7.531 | 0.092 | 1.90366 | 31.3 |
| 10 | 1.606 | 0.183 | | |
| 11 | −8.937 | 0.092 | 1.88300 | 40.8 |
| 12 | 0.977 | 0.380 | 1.92286 | 20.9 |
| 13 | −310.554 | 0.120 | | |
| 14 | −1.702 | 0.092 | 1.88300 | 40.8 |
| 15 | −78.484 | variable | | |
| 16 | 3.839 | 0.255 | 1.48749 | 70.4 |
| 17 | −3.062 | 0.043 | | |
| 18 | INF | variable | | |
| 19 | 5.505 | 0.745 | 1.74330 | 49.3 |
| 20 | −1.142 | 0.139 | 1.90366 | 31.3 |
| 21 | −2.900 | variable | | |
| 22 | 4.610 | 0.119 | 1.88300 | 40.8 |
| 23 | 1.677 | 0.511 | | |
| 24 | 3.022 | 0.532 | 1.48749 | 70.4 |
| 25 | −1.987 | 0.106 | 1.90366 | 31.3 |
| 26 | −3.005 | 2.210 | | |
| 27 | INF | 0.064 | 1.51680 | 64.2 |
| 28 | INF | 0.130 | | |

A distance d8 between the first lens group GR1 and the second lens group GR2, a distance d15 between the second lens group GR2 and the third lens group GR3, a distance d18 between the third lens group GR3 (aperture diaphragm IR) and the fourth lens group GR4, and a distance d21 between the fourth lens group GR4 and the fifth lens group GR5 change when zooming from the maximum wide angle state to the maximum telephoto state. These distances in the maximum wide angle state (f=1.00), the intermediate focal distance state (f=5.61), and the maximum telephoto state (f=12.00) in Third Numerical Example are shown in Table 10 together with a focal distance "f".

TABLE 10

| | f | | |
|---|---|---|---|
| | 1.00 | 5.61 | 12.00 |
| d8 | 0.09 | 2.20 | 2.93 |
| d15 | 2.88 | 0.78 | 0.05 |
| d18 | 2.70 | 0.72 | 0.98 |
| d21 | 0.27 | 2.24 | 1.99 |

Both surfaces (r7, r8) of the positive lens L4, both surfaces (r16, r17) of the positive lens L9, and an object side surface (r19) of the positive lens L10 are aspheric. The fourth order, sixth order, eighth order, and tenth order aspheric surface coefficients A4, A6, A8, and A10 of each of the surfaces in the Third Numerical Example are shown in Table 11.

TABLE 11

| | A4 | A6 | A8 | A10 |
|---|---|---|---|---|
| r7 | −2.0037E−03 | −3.4503E−04 | 1.5685E−04 | −1.2930E−04 |
| r8 | −2.3373E−03 | 7.4203E−05 | −5.9182E−05 | −6.6659E−05 |
| r16 | 3.2235E−03 | 3.4566E−02 | 1.4976E−01 | −9.5509E−02 |
| r17 | 2.5158E−02 | 2.1008E−02 | 1.8741E−01 | −1.2380E−01 |
| r19 | 4.5384E−03 | 7.5780E−04 | 1.7515E−02 | −1.2671E−02 |

Values of the Third Numerical Example corresponding to the conditional expressions (1) to (4) are shown in Table 12 together with the focal distance "f", F number "Fno", and half-angle of view "ω"

TABLE 12

| f | 1.00~12.00 |
|---|---|
| Fno | 3.66~5.69 |
| ω | 31.46~2.77 |
| f1/fw | 3.90 |
| Vave | 64.95 |
| f3/fw | 3.54 |
| (1 − βa) · βb | 0.65 |

Figure 10:
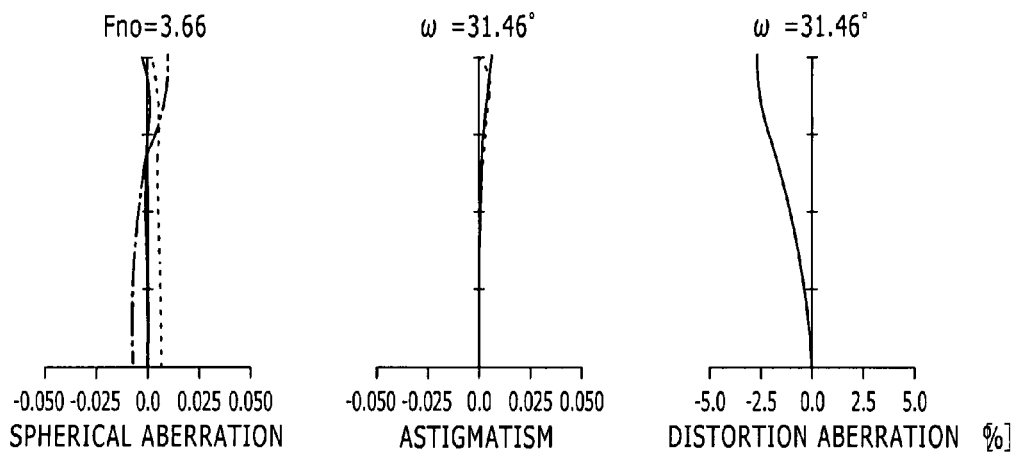
FIG. 10, together with FIGS. 11 and 12, is an aberration graph of a Third Numerical Example in which specific values are applied to the third embodiment, and shows a spherical aberration, astigmatism, and a distortion aberration in a maximum wide angle state.
Figure 11:
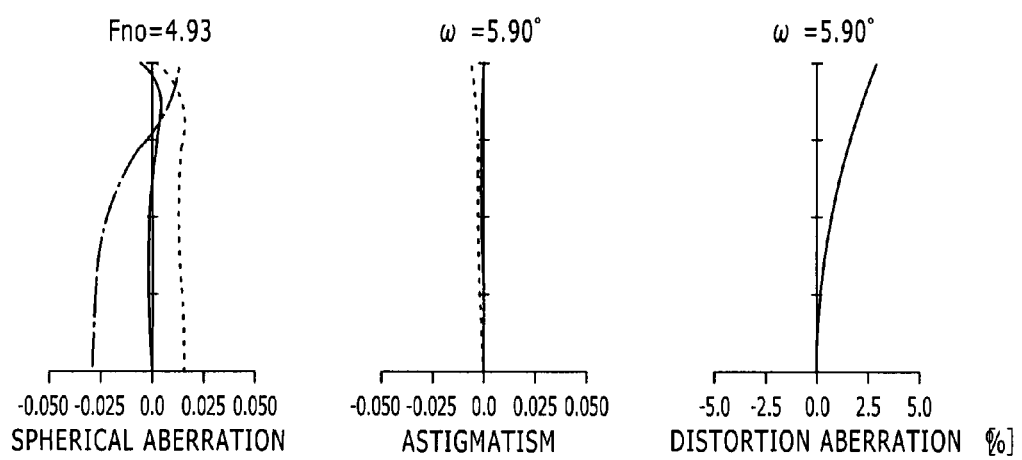
FIG. 11 shows a spherical aberration, astigmatism, and a distortion aberration in an intermediate focal distance state.
Figure 12:
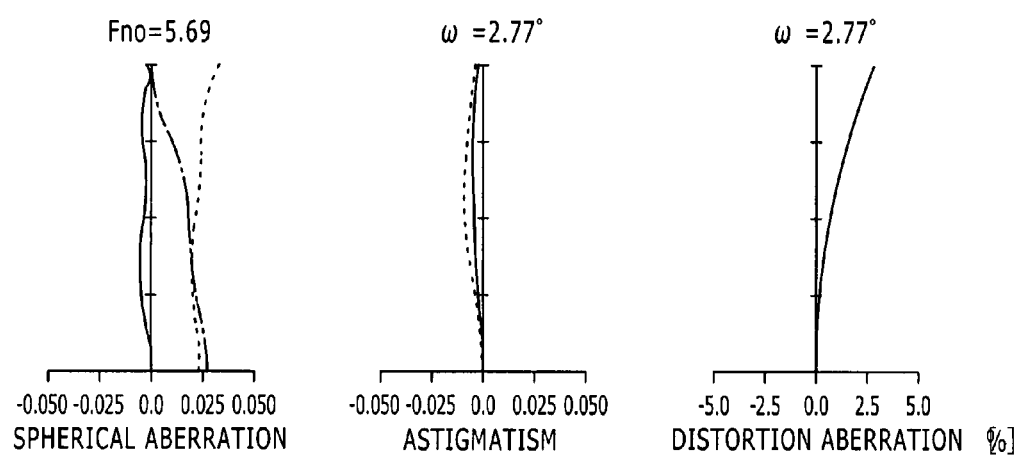
FIG. 12 shows a spherical aberration, astigmatism, and a distortion aberration in a maximum telephoto state.

FIGS. 10 to 12 are respectively aberration graphs showing a spherical aberration, astigmatism, and a distortion aberration of the Third Numerical Example. FIGS. 10 to 12 respectively show aberration graphs in the maximum wide angle state, the intermediate focal distance state, and the maximum telephoto state. In the spherical aberration of the respective aberration graphs of FIGS. 10 to 12, a solid line, a broken line, and a dash-and-dot line indicate values for d-line, C-line, and g-line respectively. In the astigmatism graph and the distortion aberration graph, values are shown for the d-line. Further, in the astigmatism graph, a solid line shows values in a sagittal image plane and a broken line shows values in a meridional image plane.

It is clear from each aberration graph that the Third Numerical Example has an excellent image forming performance.

Figure 13:
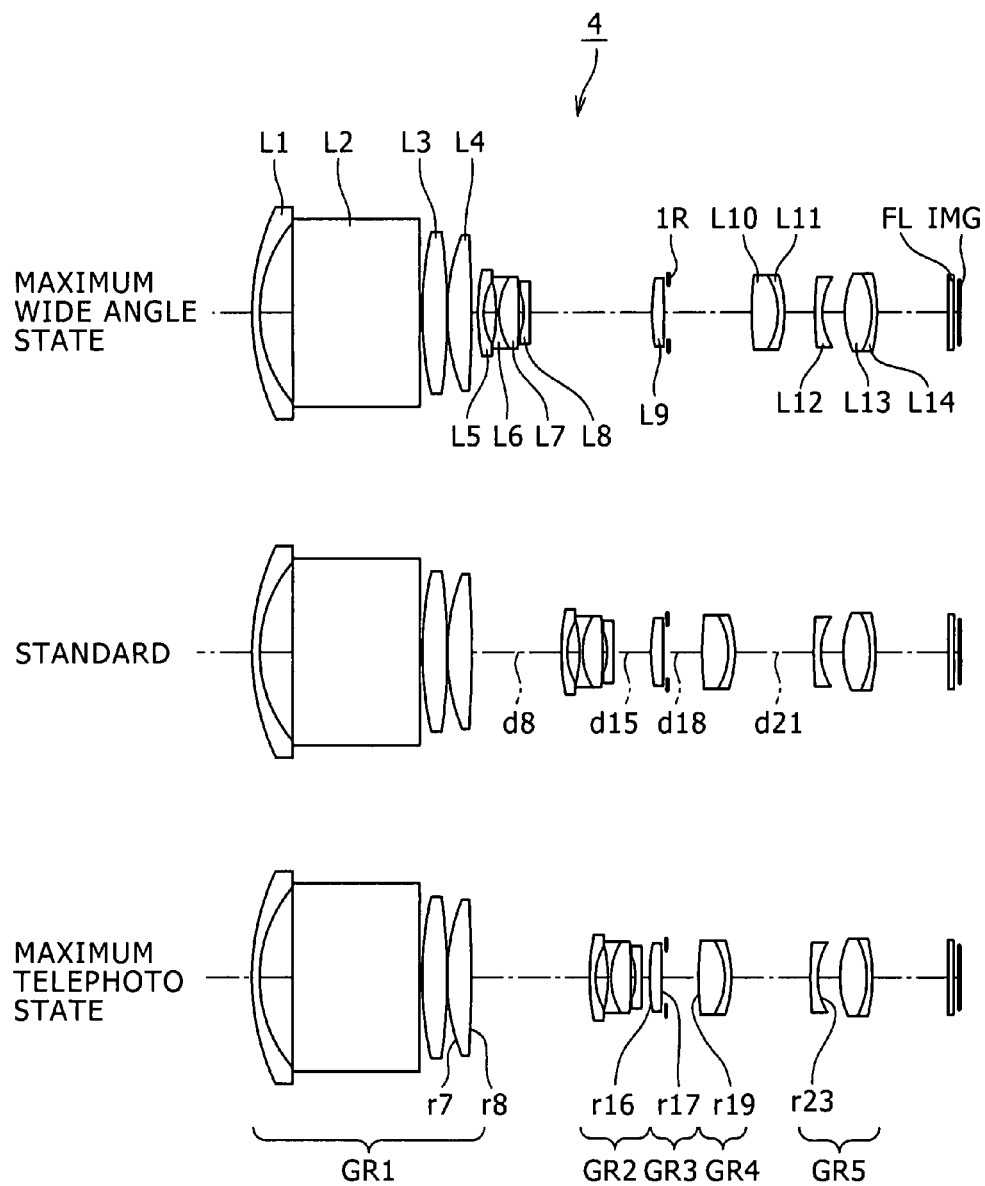
FIG. 13 is a view showing a lens arrangement of a fourth embodiment of the zoom lens in accordance with the present invention.

FIG. 13 shows a lens arrangement of a zoom lens 4 in accordance with a fourth embodiment of the present invention, in which an upper part shows the maximum wide angle state, a middle part shows an intermediate focal distance state between the maximum wide angle state and the maximum telephoto state, and a lower part shows the maximum telephoto state.

The zoom lens 4 is constructed by arranging, in order from an object side to an image plane side, a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power. When zooming from the maximum wide angle state to the maximum telephoto state, the first lens group GR1 is fixed in the optical axis direction, the second lens group GR2 is moved in the optical axis direction such that the distance from the first lens group GR1 increases, the third lens group GR3 is fixed in the optical axis direction, the fourth lens group GR4 is moved in the optical axis direction for focusing and compensating for shifting of the image plane position at the time of zooming, and the fifth lens group GR5 is fixed in the optical axis direction.

In the zoom lens 4, the first lens group GR1 includes a negative meniscus lens L1 whose convex surface faces towards the object side, a rectangular prism L2, a positive lens L3 in a biconvex shape, and a positive lens L4 in a biconvex shape both of whose surfaces are formed to be aspheric surfaces, the lenses being arranged in order from the object side to the image plane side. The second lens group GR2 includes a negative meniscus lens L5 whose convex surface faces towards the object side, a negative cemented lens of a biconcave lens L6 and a biconvex lens L7, and a negative meniscus lens L8 whose concave surface faces towards the object side, the lenses being arranged in order from the object side to the image plane side. The third lens group GR3 includes one lens L9 having a positive refractive power both of whose surfaces are formed to be aspheric surfaces. The fourth lens group GR4 includes a positive cemented lens of a positive biconvex lens L10 whose object side surface is formed to be an aspheric surface and a negative meniscus lens L11 whose convex surface faces towards the image plane side, the lenses being arranged in order from the object side to the image plane side. The fifth lens group GR5 includes a negative meniscus lens L12 whose convex surface faces toward the object side and whose image plane side surface is arranged to be an aspheric surface, and a positive cemented lens of a biconvex lens L13 and a negative meniscus lens L14 whose convex surface faces towards the image plane side, the lenses being arranged in order from the object side to the image plane side. The negative meniscus lens L12 in the fifth lens group GR5 constitutes the front group having a negative refractive power, and the positive cemented lens constructed with the lenses L13 and L14 constitutes the rear group having a positive refractive power, and can shift the image by moving the rear group in the direction orthogonal to the optical axis. It should be noted that an aperture diaphragm IR is arranged in close proximity with the image plane side of the third lens group GR3, and is fixed in the optical axis direction at the time of zooming. Further, a filter FL, such as an infrared ray cut filter, a lowpass filter, etc., is arranged between the fifth lens group GR5 and an image plane IMG.

The lens data of the Fourth Numerical Example, in which the particular values are applied to the zoom lens 4 in accordance with the fourth embodiment are shown in Table 13.

TABLE 13

| i | ri | di | ni | vi |
|---|-----|-----|---------|------|
| 1 | 6.567 | 0.149 | 1.92286 | 20.9 |
| 2 | 3.229 | 0.541 | | |
| 3 | INF | 2.553 | 1.90366 | 31.3 |
| 4 | INF | 0.043 | | |

TABLE 13-continued

| i | ri | di | ni | vi |
|---|-----|-----|---------|------|
| 5 | 6.594 | 0.474 | 1.49700 | 81.6 |
| 6 | −7.809 | 0.021 | | |
| 7 | 3.574 | 0.484 | 1.58313 | 59.5 |
| 8 | −17.913 | variable | | |
| 9 | 7.207 | 0.092 | 1.90366 | 31.3 |
| 10 | 1.564 | 0.219 | | |
| 11 | −4.414 | 0.092 | 1.88300 | 40.8 |
| 12 | 1.131 | 0.394 | 1.92286 | 20.9 |
| 13 | −8.255 | 0.113 | | |
| 14 | −1.757 | 0.092 | 1.88300 | 40.8 |
| 15 | −17.539 | variable | | |
| 16 | 3.224 | 0.255 | 1.58313 | 59.5 |
| 17 | −5.250 | 0.043 | | |
| 18 | INF | variable | | |
| 19 | 4.071 | 0.444 | 1.74330 | 49.3 |
| 20 | −1.426 | 0.092 | 1.84666 | 23.8 |
| 21 | −3.212 | variable | | |
| 22 | 2.398 | 0.092 | 1.85135 | 40.1 |
| 23 | 1.061 | 0.426 | | |
| 24 | 1.480 | 0.532 | 1.48749 | 70.4 |
| 25 | −2.217 | 0.096 | 1.90366 | 31.3 |
| 26 | −5.715 | 1.432 | | |
| 27 | INF | 0.064 | 1.51680 | 64.2 |
| 28 | INF | 0.130 | | |

A distance d8 between the first lens group GR1 and the second lens group GR2, a distance d15 between the second lens group GR2 and the third lens group GR3, a distance d18 between the third lens group GR3 (aperture diaphragm IR) and the fourth lens group GR4, and a distance d21 between the fourth lens group GR4 and the fifth lens group GR5 change when zooming from the maximum wide angle state to the maximum telephoto state. These distances in the maximum wide angle state (f=1.00), the intermediate focal distance state (f=4.00), and the maximum telephoto state (f=8.00) in the Fourth Numerical Example are shown in Table 14 together with a focal distance "f".

TABLE 14

| | f | | |
|---|------|------|------|
| | 1.00 | 4.00 | 8.00 |
| d8 | 0.08 | 1.73 | 2.37 |
| d15 | 2.33 | 0.69 | 0.05 |
| d18 | 1.71 | 0.68 | 0.62 |
| d21 | 0.63 | 1.66 | 1.72 |

Both surfaces (r7, r8) of the positive lens L4, both surfaces (r16, r17) of the positive lens L9, an object side surface (r19) of the positive lens L10, and an object side surface (r23) of the negative lens L12 are aspheric. The fourth order, sixth order, eighth order, and tenth order aspheric surface coefficients A4, A6, A8, and A10 of each of the surfaces in the Fourth Numerical Example are shown in Table 15.

TABLE 15

| | A4 | A6 | A8 | A10 |
|-----|-------------|-------------|-------------|-------------|
| r7 | −2.9462E−03 | 2.9393E−04 | 1.4975E−04 | −1.8497E−04 |
| r8 | −2.8525E−03 | 1.5091E−03 | −5.3344E−04 | −2.7344E−05 |
| r16 | 4.2759E−02 | 1.0833E−01 | −5.5811E−02 | 2.8281E−01 |
| r17 | 6.9473E−02 | 1.1950E−01 | −8.3643E−02 | 3.7358E−01 |
| r19 | −5.9981E−03 | 1.2312E−02 | −3.1000E−02 | 3.0311E−02 |
| r23 | −1.8433E−02 | −3.7359E−04 | −7.1311E−02 | 8.1889E−02 |

Values of the Fourth Numerical Example corresponding to the conditional expressions (1) to (4) are shown in Table 16 together with the focal distance "f", F number "Fno", and half-angle of view "ω"

TABLE 16

| f | 1.00~8.00 |
|---|---|
| Fno | 3.23~4.07 |
| ω | 31.95~4.15 |
| f1/fw | 3.55 |
| Vave | 70.55 |
| f3/fw | 3.46 |
| (1 − βa) · βb | 0.61 |

Figure 14:
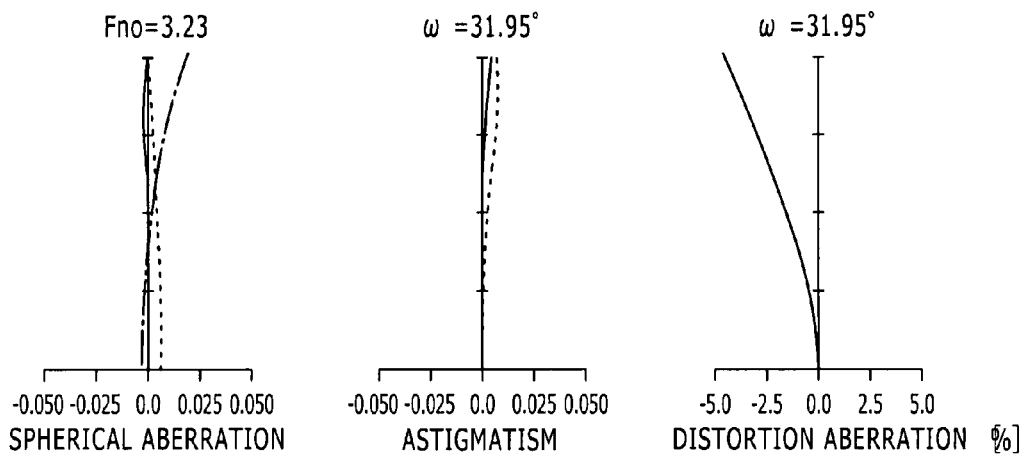
FIG. 14, together with FIGS. 15 and 16, is an aberration graph of a Fourth Numerical Example in which specific values are applied to the fourth embodiment, and shows a spherical aberration, astigmatism, and a distortion aberration in a maximum wide angle state.
Figure 15:
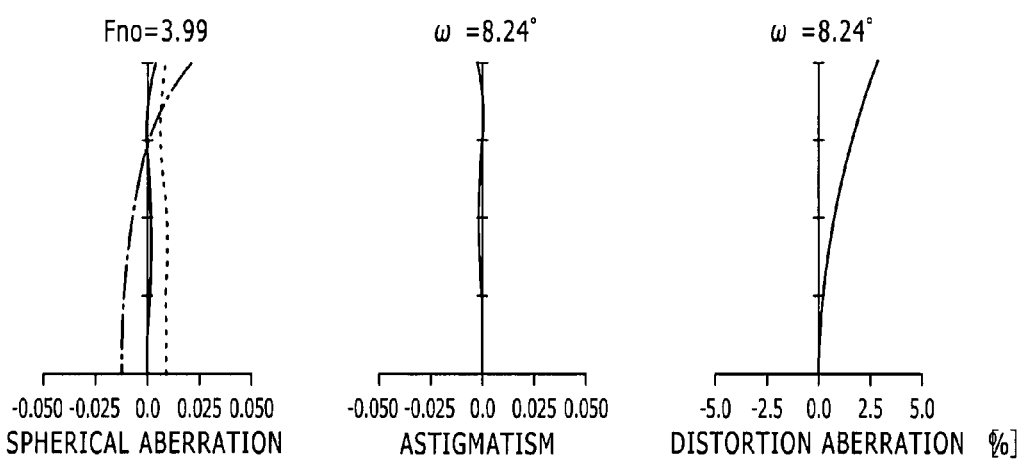
FIG. 15 shows a spherical aberration, astigmatism, and a distortion aberration in an intermediate focal distance state.
Figure 16:
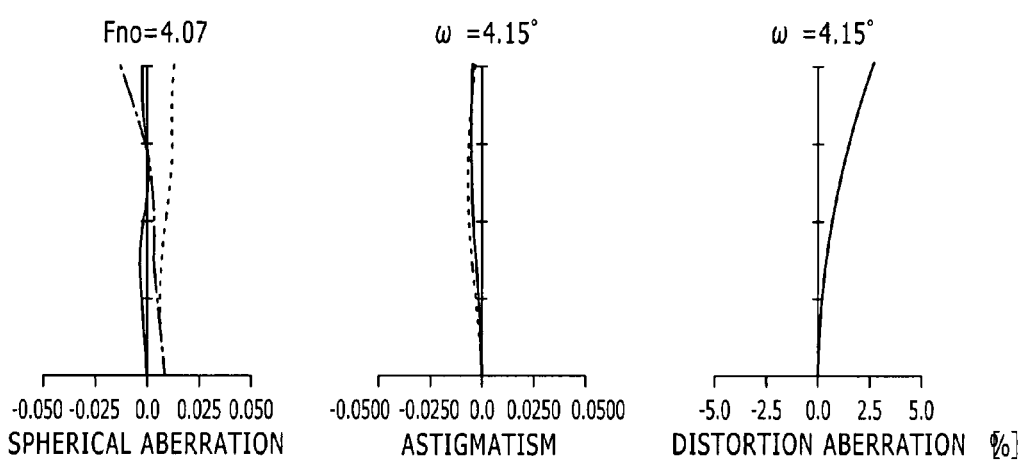
FIG. 16 shows a spherical aberration, astigmatism, and a distortion aberration in a maximum telephoto state.

FIGS. 14 to 16 are respectively aberration graphs showing a spherical aberration, astigmatism, and a distortion aberration of the Fourth Numerical Example. FIGS. 14 to 16 respectively show aberration graphs in the maximum wide angle state, the intermediate focal distance state, and the maximum telephoto state. In the spherical aberration of the respective aberration graphs of FIGS. 14 to 16, a solid line, a broken line, and a dash-and-dot line indicate values for d-line, C-line, and g-line respectively. In the astigmatism graph and the distortion aberration graph, values are shown for the d-line. Further, in the astigmatism graph, a solid line shows values in a sagittal image plane and a broken line shows values in a meridional image plane.

It is clear from each aberration graph that the Fourth Numerical Example has an excellent image forming performance.

Figure 17:
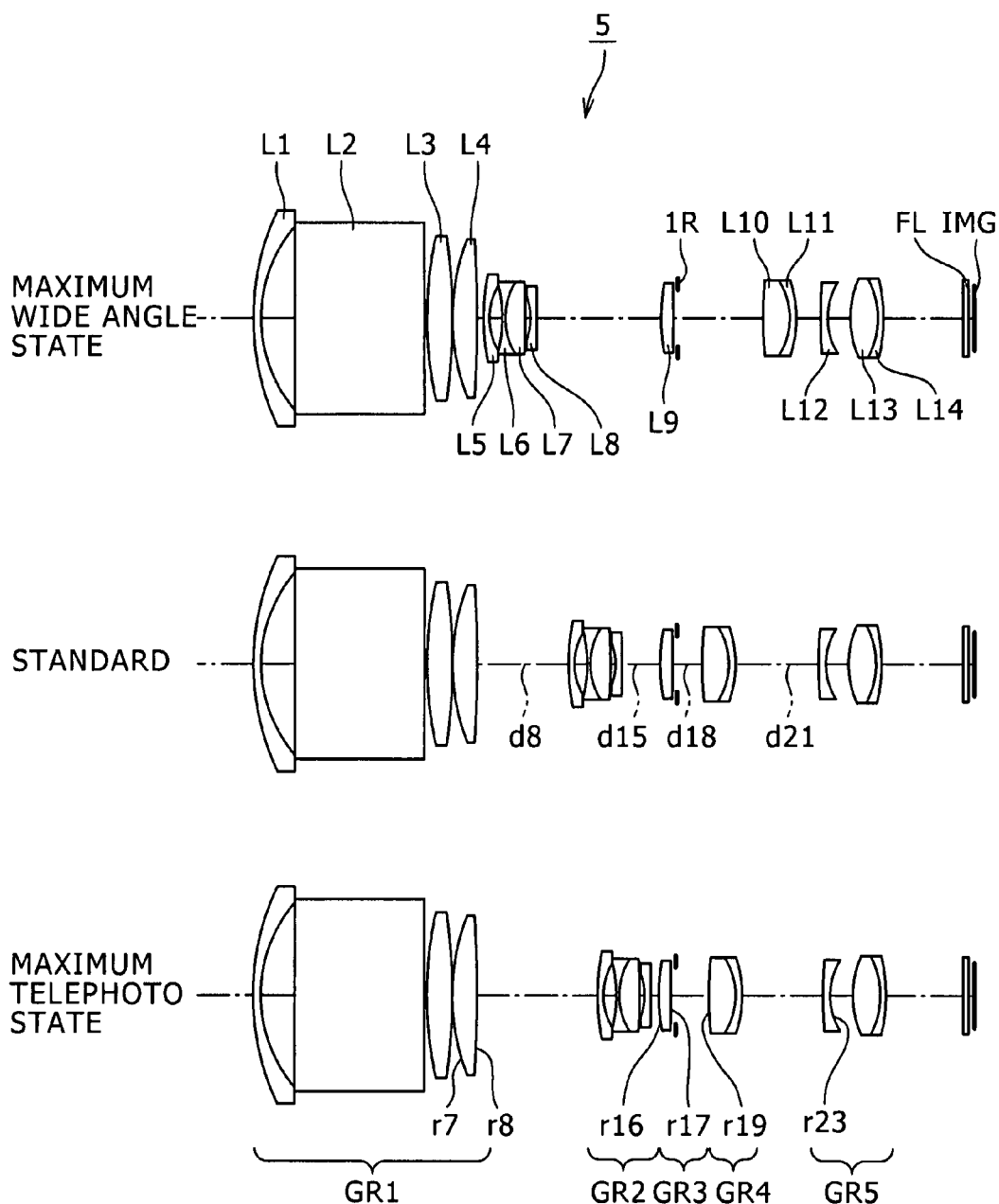
FIG. 17 is a view showing a lens arrangement of a fifth embodiment of the zoom lens in accordance with the present invention.

FIG. 17 shows a lens arrangement of a zoom lens 5 in accordance with a fifth embodiment of the present invention, in which an upper part shows the maximum wide angle state, a middle part shows an intermediate focal distance state between the maximum wide angle state and the maximum telephoto state, and a lower part shows the maximum telephoto state.

The zoom lens 5 is constructed by arranging, in order from an object side to an image plane side, a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power. When zooming from the maximum wide angle state to the maximum telephoto state, the first lens group GR1 is fixed in the optical axis direction, the second lens group GR2 is moved in the optical axis direction such that the distance from the first lens group GR1 increases, the third lens group GR3 is fixed in the optical axis direction, the fourth lens group GR4 is moved in the optical axis direction for focusing and compensating for shifting of the image plane position at the time of zooming, and the fifth lens group GR5 is fixed in the optical axis direction.

In the zoom lens 5, the first lens group GR1 includes a negative meniscus lens L1 whose convex surface faces towards the object side, a rectangular prism L2, a positive lens L3 in a biconvex shape, and a positive lens L4 in a biconvex shape both of whose surfaces are formed to be aspheric surfaces, the lenses being arranged in order from the object side to the image plane side. The second lens group GR2 includes a negative meniscus lens L5 whose convex surface faces towards the object side, a negative cemented lens of a biconcave lens L6 and a biconvex lens L7, and a negative meniscus lens L8 whose concave surface faces towards the object side, the lenses being arranged in order from the object side to the image plane side. The third lens group GR3 includes one lens L9 having a positive refractive power both of whose surfaces are formed to be aspheric surfaces. The fourth lens group GR4 includes a positive cemented lenses of a positive biconvex lens L10 whose object side surface is formed to be an aspheric surface and a negative meniscus lens L11 whose convex surface faces towards the image plane side, the lenses being arranged in order from the object side to the image plane side. The fifth lens group GR5 includes a negative meniscus lens L12 whose convex surface faces towards the object side and whose image plane side surface is arranged to be an aspheric surface, and a positive cemented lens of a biconvex lens L13 and a negative meniscus lens L14 whose convex surface faces towards the image plane side, the lenses being arranged in order from the object side to the image plane side. The negative meniscus lens L12 in the fifth lens group GR5 constitutes the front group having a negative refractive power, and the positive cemented lens constructed with the lenses L13 and L14 constitutes the rear group having a positive refractive power, and can shift the image by moving the rear group in the direction orthogonal to the optical axis. It should be noted that an aperture diaphragm IR is arranged in close proximity with the image plane side of the third lens group GR3, and is fixed in the optical axis direction at the time of zooming. Further, a filter FL, such as an infrared ray cut filter, a lowpass filter, etc., is arranged between the fifth lens group GR5 and an image plane IMG.

The lens data of the Fifth Numerical Example, in which the specific values are applied to the zoom lens 5 in accordance with the fifth embodiment are shown in Table 17.

TABLE 17

| i | ri | di | ni | vi |
|---|---|---|---|---|
| 1 | 4.690 | 0.155 | 1.92286 | 20.9 |
| 2 | 2.800 | 0.636 | | |
| 3 | INF | 2.479 | 1.90366 | 31.3 |
| 4 | INF | 0.043 | | |
| 5 | 6.828 | 0.485 | 1.49700 | 81.6 |
| 6 | −7.002 | 0.021 | | |
| 7 | 4.164 | 0.438 | 1.58313 | 59.5 |
| 8 | −19.534 | variable | | |
| 9 | 10.612 | 0.092 | 1.90366 | 31.3 |
| 10 | 1.605 | 0.222 | | |
| 11 | −3.212 | 0.092 | 1.88300 | 40.8 |
| 12 | 1.254 | 0.374 | 1.92286 | 20.9 |
| 13 | −5.374 | 0.096 | | |
| 14 | −1.906 | 0.092 | 1.88300 | 40.8 |
| 15 | −17.317 | variable | | |
| 16 | 3.493 | 0.255 | 1.48749 | 70.4 |
| 17 | −3.478 | 0.043 | | |
| 18 | INF | variable | | |
| 19 | 4.632 | 0.598 | 1.74330 | 49.3 |
| 20 | −1.126 | 0.092 | 1.90366 | 31.3 |
| 21 | −2.722 | variable | | |
| 22 | 2.788 | 0.092 | 1.85135 | 40.1 |
| 23 | 1.098 | 0.426 | | |
| 24 | 1.616 | 0.532 | 1.48749 | 70.4 |
| 25 | −1.871 | 0.096 | 1.90366 | 31.3 |
| 26 | −3.969 | 1.785 | | |
| 27 | INF | 0.064 | 1.51680 | 64.2 |
| 28 | INF | 0.130 | | |

A distance d8 between the first lens group GR1 and the second lens group GR2, a distance d15 between the second lens group GR2 and the third lens group GR3, a distance d18 between the third lens group GR3 (aperture diaphragm IR) and the fourth lens group GR4, and a distance d21 between the fourth lens group GR4 and the fifth lens group GR5 change when zooming from the maximum wide angle state to the maximum telephoto state. These distances in the maximum wide angle state (f=1.00), the intermediate focal distance state (f=4.34), and the maximum telephoto state (f=10.00) in the Fifth Numerical Example are shown in Table 18 together with a focal distance "f".

TABLE 18

|   | f | | |
|---|---|---|---|
|   | 1.00 | 4.34 | 10.00 |
| d8 | 0.08 | 1.96 | 2.78 |
| d15 | 2.73 | 0.85 | 0.03 |
| d18 | 1.77 | 0.63 | 0.72 |
| d21 | 0.56 | 1.70 | 1.61 |

Both surfaces (r7, r8) of the positive lens L4, both surfaces (r16, r17) of the positive lens L9, an object side surface (r19) of the positive lens L10, and an object side surface (r23) of the negative lens L12 are aspheric. The fourth order, sixth order, eighth order, and tenth order aspheric surface coefficients A4, A6, A8, and A10 of each of the surfaces in the Fifth Numerical Example are shown in Table 19.

TABLE 19

|   | A4 | A6 | A8 | A10 |
|---|---|---|---|---|
| r7 | −2.7259E−03 | −3.6307E−04 | 2.5397E−04 | −1.5581E−04 |
| r8 | −3.8863E−03 | 2.7829E−04 | −3.5271E−05 | −8.2765E−05 |
| r16 | −1.4739E−02 | 1.8129E−02 | 1.5741E−01 | −1.7159E−01 |
| r17 | 1.5810E−02 | 6.6024E−03 | 1.9329E−01 | −2.1037E−01 |
| r19 | 7.5760E−04 | 1.3962E−02 | −1.0855E−02 | 1.1662E−02 |
| r23 | −2.9609E−02 | 2.0289E−02 | −1.1607E−01 | 1.0800E−01 |

Values of the Fifth Numerical Example corresponding to the conditional expressions (1) to (4) are shown in Table 20 together with the focal distance "f", F number "Fno", and half-angle of view "ωr".

TABLE 20

| f | 1.00~10.00 |
|---|---|
| Fno | 3.43~4.74 |
| ω | 31.78~3.32 |
| f1/fw | 3.83 |
| Vave | 70.55 |
| f3/fw | 3.62 |
| (1 − βa) · βb | 0.71 |

Figure 18:
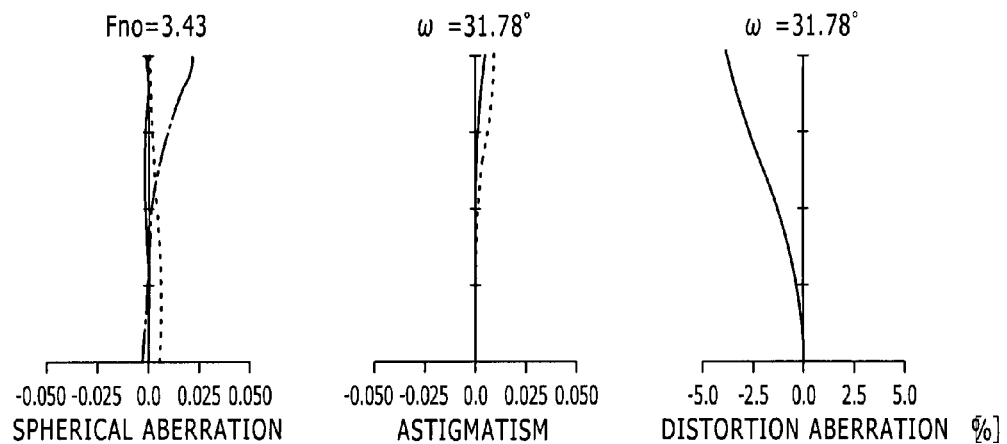
FIG. 18, together with FIGS. 19 and 20, is an aberration graph of a Fifth Numerical Example in which specific values are applied to the fifth embodiment, and shows a spherical aberration, astigmatism, and a distortion aberration in a maximum wide angle state.
Figure 19:
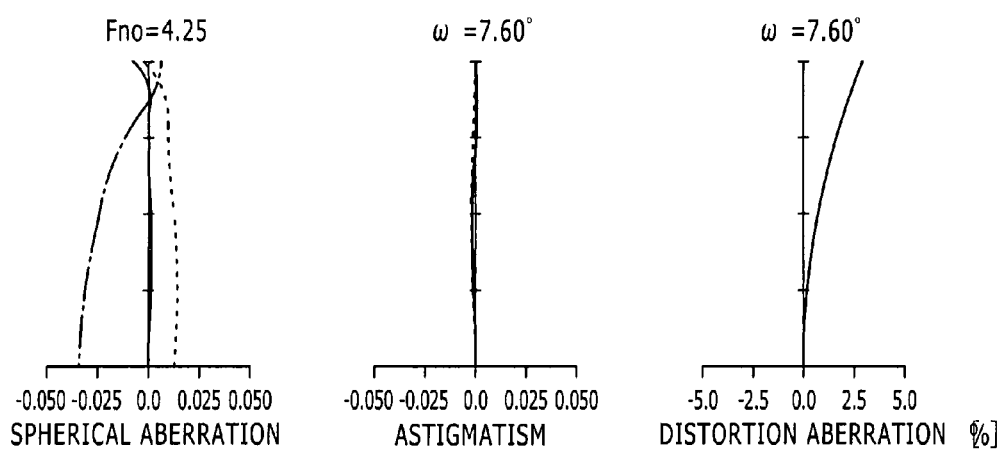
FIG. 19 shows a spherical aberration, astigmatism, and a distortion aberration in an intermediate focal distance state.
Figure 20:
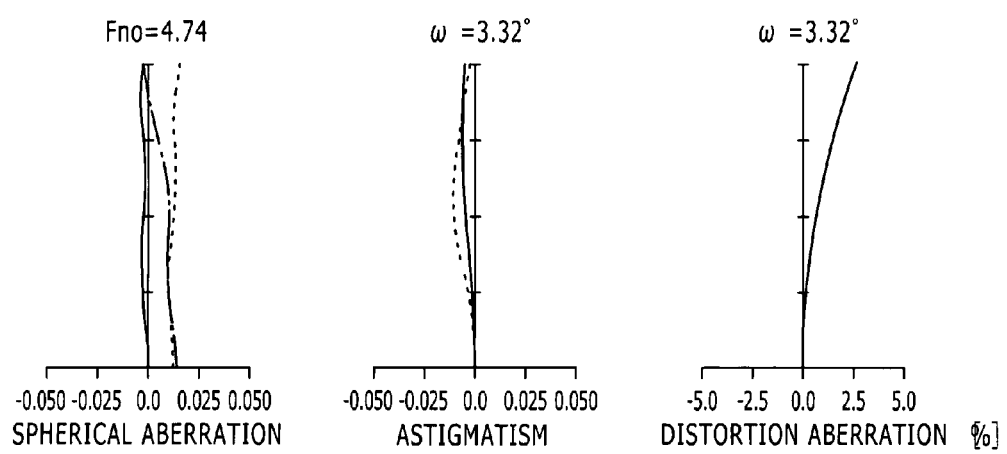
FIG. 20 shows a spherical aberration, astigmatism, and a distortion aberration in a maximum telephoto state.

FIGS. 18 to 20 are respectively aberration graphs showing a spherical aberration, astigmatism, and a distortion aberration of the Fifth Numerical Example. FIGS. 18 to 20 respectively show aberration graphs in the maximum wide angle state, the intermediate focal distance state, and the maximum telephoto state. In the spherical aberration of the respective aberration graphs of FIGS. 18 to 20, a solid line, a broken line, and a dash-and-dot line indicate values for d-line, C-line, and g-line respectively. In the astigmatism graph and the distortion aberration graph, values are shown for the d-line. Further, in the astigmatism graph, a solid line shows values in a sagittal image plane and a broken line shows values in a meridional image plane.

It is clear from each aberration graph that the Fifth Numerical Example has an excellent image forming performance.

Figure 21:
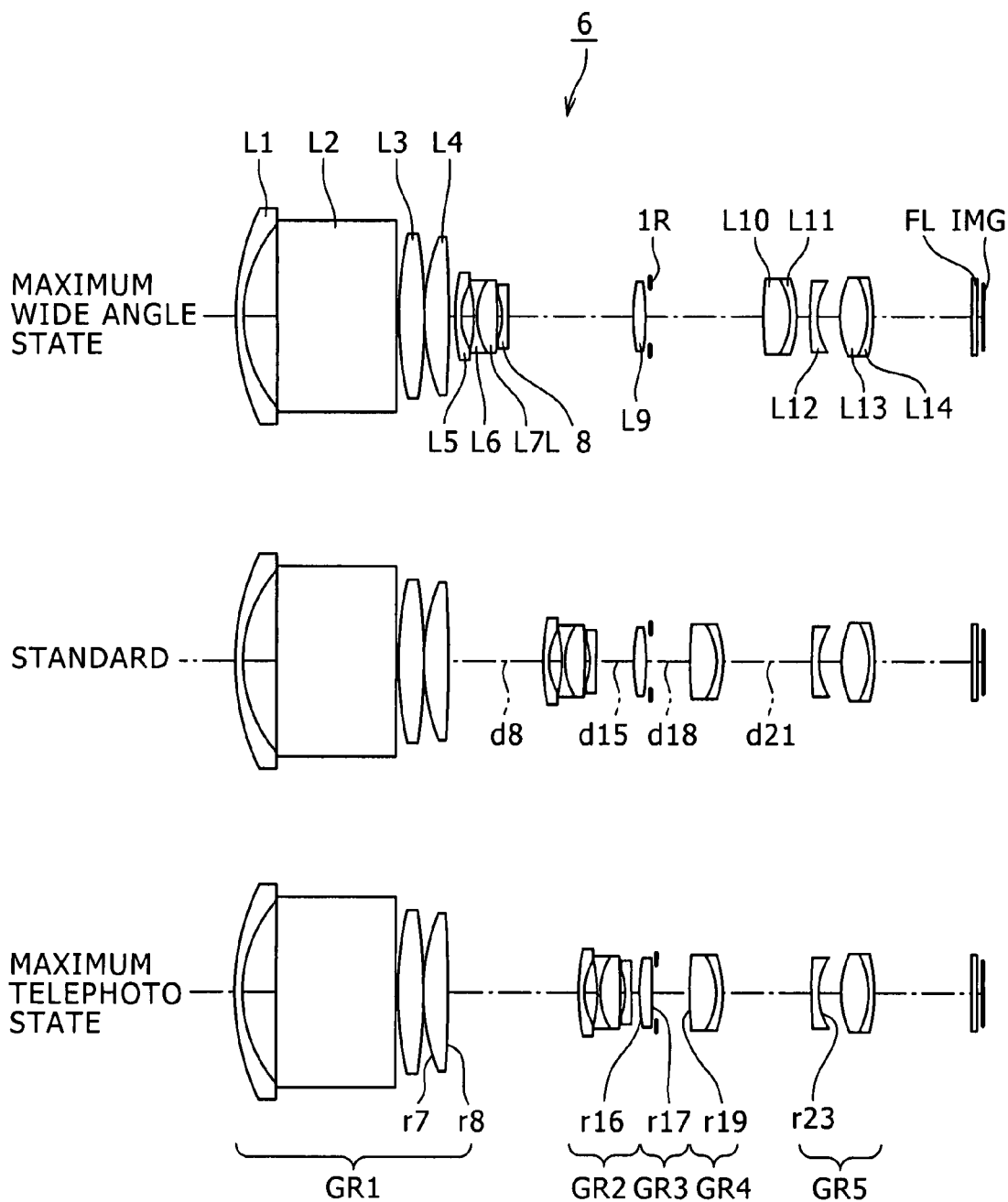
FIG. 21 is a view showing a lens arrangement of a sixth embodiment of the zoom lens in accordance with the present invention.

FIG. 21 shows a lens arrangement of a zoom lens 6 in accordance with a sixth embodiment of the present invention, in which an upper part shows the maximum wide angle state, a middle part shows an intermediate focal distance state between the maximum wide angle state and the maximum telephoto state, and a lower part shows the maximum telephoto state.

The zoom lens 6 is constructed by arranging, in order from an object side to an image plane side, a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power. When zooming from the maximum wide angle state to the maximum telephoto state, the first lens group GR1 is fixed in the optical axis direction, the second lens group GR2 is moved in the optical axis direction such that the distance from the first lens group GR1 increases, the third lens group GR3 is fixed in the optical axis direction, the fourth lens group GR4 is moved in the optical axis direction for focusing and compensating for shifting of the image plane position at the time of zooming, and the fifth lens group GR5 is fixed in the optical axis direction.

In the zoom lens 6, the first lens group GR1 includes a negative meniscus lens L1 whose convex surface faces towards the object side, a rectangular prism L2, a positive lens L3 in a biconvex shape, and a positive lens L4 in a biconvex shape both of whose surfaces are formed to be aspheric surfaces, the lenses being arranged in order from the object side to the image plane side. The second lens group GR2 includes a negative meniscus lens L5 whose convex surface faces towards the object side, a negative cemented lens of a biconcave lens L6 and a biconvex lens L7, and a negative meniscus lens L8 whose concave surface faces towards the object side, the lenses being arranged in order from the object side to the image plane side. The third lens group GR3 includes one lens L9 having a positive refractive power both of whose surfaces are formed to be aspheric surfaces. The fourth lens group GR4 includes a positive cemented lens of a positive biconvex lens L10 whose object side surface is formed to be an aspheric surface and a negative meniscus lens L11 whose convex surface faces towards the image plane side, the lenses being arranged in order from the object side to the image plane side. The fifth lens group GR5 includes a negative meniscus lens L12 whose convex surface faces towards the object side and whose image plane side surface is arranged to be an aspheric surface, and a positive cemented lens of a biconvex lens L13 and a negative meniscus lens L14 whose convex surface faces towards the image plane side, the lenses being arranged in order from the object side to the image plane side. The negative meniscus lens L12 in the fifth lens group GR5 constitutes the front group having a negative refractive power, and the positive cemented lens constructed with the lenses L13 and L14 constitutes the rear group having a positive refractive power, and can shift the image by moving the rear group in the direction orthogonal to the optical axis. It should be noted that an aperture diaphragm IR is arranged in close proximity with the image plane side of the third lens group GR3, and is fixed in the optical axis direction at the time of zooming. Further, a filter FL, such as an infrared ray cut filter, a lowpass filter, etc., is arranged between the fifth lens group GR5 and an image plane IMG.

The lens data of the Sixth Numerical Example, in which the particular value are applied to the zoom lens 6 in accordance with the sixth embodiment are shown in Table 21.

TABLE 21

| i | ri | di | ni | vi |
|---|---|---|---|---|
| 1 | 6.104 | 0.152 | 1.92286 | 20.9 |
| 2 | 3.208 | 0.539 | | |
| 3 | INF | 2.466 | 1.90366 | 31.3 |
| 4 | INF | 0.043 | | |

TABLE 21-continued

| i | ri | di | ni | vi |
|---|------|--------|---------|------|
| 5 | 5.668 | 0.525 | 1.48749 | 70.4 |
| 6 | −6.879 | 0.021 | | |
| 7 | 4.191 | 0.398 | 1.58313 | 59.5 |
| 8 | −41.593 | variable | | |
| 9 | 5.405 | 0.092 | 1.90366 | 31.3 |
| 10 | 1.569 | 0.212 | | |
| 11 | −4.516 | 0.092 | 1.88300 | 40.8 |
| 12 | 1.073 | 0.386 | 1.92286 | 20.9 |
| 13 | −13.929 | 0.116 | | |
| 14 | −1.748 | 0.092 | 1.88300 | 40.8 |
| 15 | −62.996 | variable | | |
| 16 | 4.932 | 0.258 | 1.48749 | 70.4 |
| 17 | −2.640 | 0.043 | | |
| 18 | INF | variable | | |
| 19 | 5.139 | 0.639 | 1.74330 | 49.3 |
| 20 | −1.199 | 0.166 | 1.90366 | 31.3 |
| 21 | −2.963 | variable | | |
| 22 | 3.415 | 0.096 | 1.85135 | 40.1 |
| 23 | 1.324 | 0.511 | | |
| 24 | 2.194 | 0.505 | 1.48749 | 70.4 |
| 25 | −2.024 | 0.106 | 1.90366 | 31.3 |
| 26 | −3.449 | 2.142 | | |
| 27 | INF | 0.064 | 1.51680 | 64.2 |
| 28 | INF | 0.130 | | |

A distance d8 between the first lens group GR1 and the second lens group GR2, a distance d15 between the second lens group GR2 and the third lens group GR3, a distance d18 between the third lens group GR3 (aperture diaphragm IR) and the fourth lens group GR4, and a distance d21 between the fourth lens group GR4 and the fifth lens group GR5 change when zooming from the maximum wide angle state to the maximum telephoto state. These distances in the maximum wide angle state (f=1.0.0), the intermediate focal distance state (f=3.47), and the maximum telephoto state (f=12.01) in the Sixth Numerical Example are shown in Table 22 together with a focal distance "f".

TABLE 22

| | f | | |
|---|---|---|---|
| | 1.00 | 3.47 | 12.01 |
| d8 | 0.18 | 1.91 | 3.12 |
| d15 | 3.00 | 1.27 | 0.07 |
| d18 | 2.23 | 1.10 | 1.48 |
| d21 | 0.34 | 1.48 | 1.10 |

Both surfaces (r7, r8) of the positive lens L4, both surfaces (r16, r17) of the positive lens L9, an object side surface (r19) of the positive lens L10, and an object side surface (r23) of the negative lens L12 are aspheric. The fourth order, sixth order, eighth order, and tenth order aspheric surface coefficients A4, A6, A8, and A10 of each of the surfaces in the Sixth Numerical Example are shown in Table 23.

TABLE 23

| | A4 | A6 | A8 | A10 |
|---|---|---|---|---|
| r7 | −2.2414E−03 | −2.0592E−04 | 1.6397E−04 | −1.3362E−04 |
| r8 | −2.4928E−03 | 3.1690E−04 | −9.6629E−05 | −6.7247E−05 |
| r16 | −3.6437E−02 | 2.9354E−02 | 6.5395E−02 | −2.1956E−01 |
| r17 | −1.1055E−02 | 1.3554E−03 | 6.0556E−02 | −2.0291E−01 |
| r19 | 1.4103E−03 | 1.2821E−02 | −1.7134E−02 | 1.7074E−02 |
| r23 | −1.5306E−02 | 1.6905E−02 | −5.8256E−02 | 3.9774E−02 |

Values of the Sixth Numerical Example corresponding to the conditional expressions (1) to (4) are shown in Table 24 together with the focal distance "f", F number "Fno", and half-angle of view "ω".

TABLE 24

| f | 1.00~12.01 |
|---|---|
| Fno | 3.63~5.64 |
| ω | 31.14~2.75 |
| f1/fw | 3.97 |
| Vave | 64.95 |
| f3/fw | 3.57 |
| $(1 - \beta a) \cdot \beta b$ | 0.71 |

Figure 22:
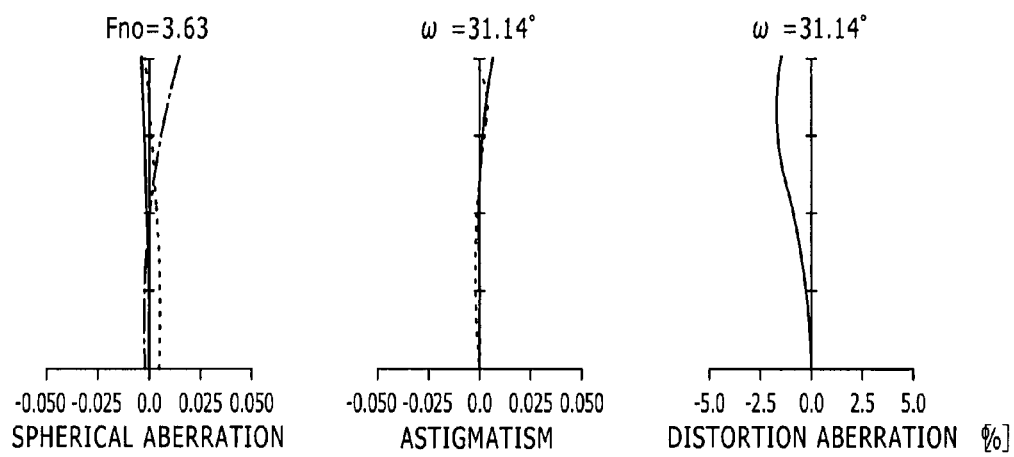
FIG. 22, together with FIGS. 23 and 24, is an aberration graph of a Sixth Numerical Example in which specific values are applied to the sixth embodiment, and shows a spherical aberration, astigmatism, and a distortion aberration in a maximum wide angle state.
Figure 23:
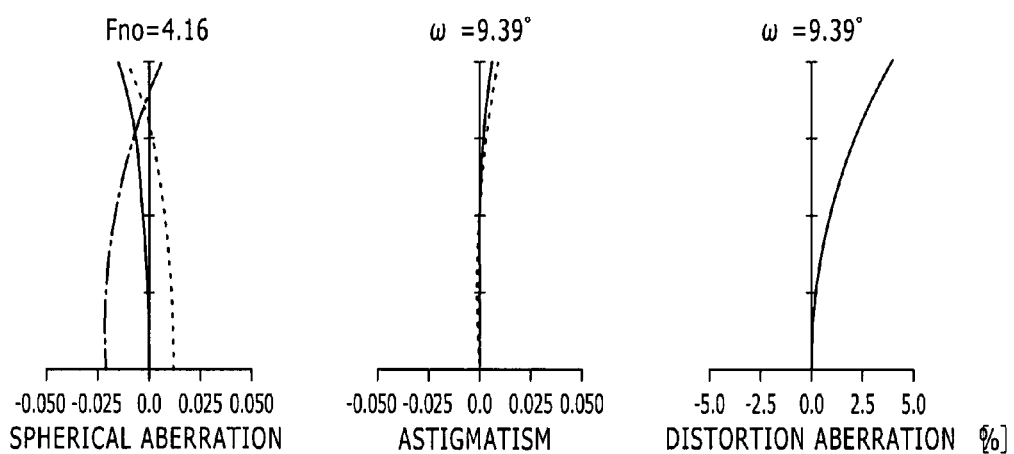
FIG. 23 shows a spherical aberration, astigmatism, and a distortion aberration in an intermediate focal distance state.
Figure 24:
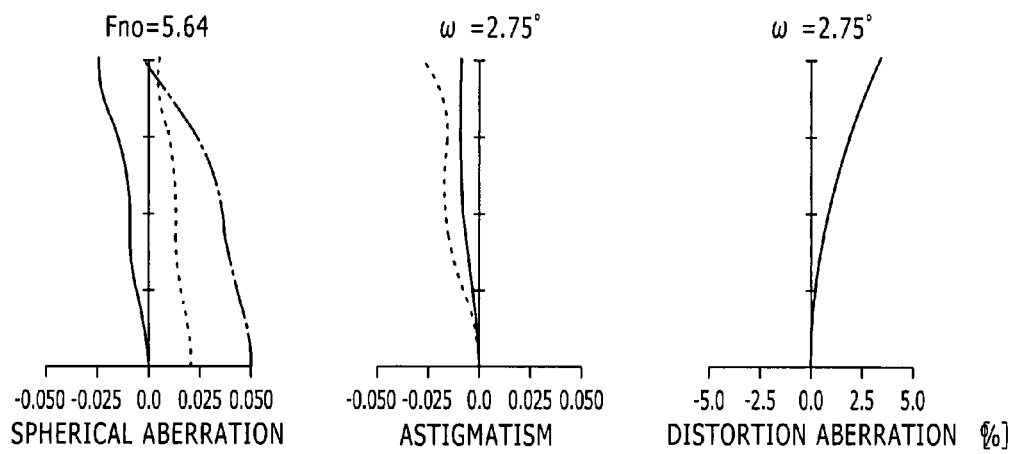
FIG. 24 shows a spherical aberration, astigmatism, and a distortion aberration in a maximum telephoto state.
Figure 25:
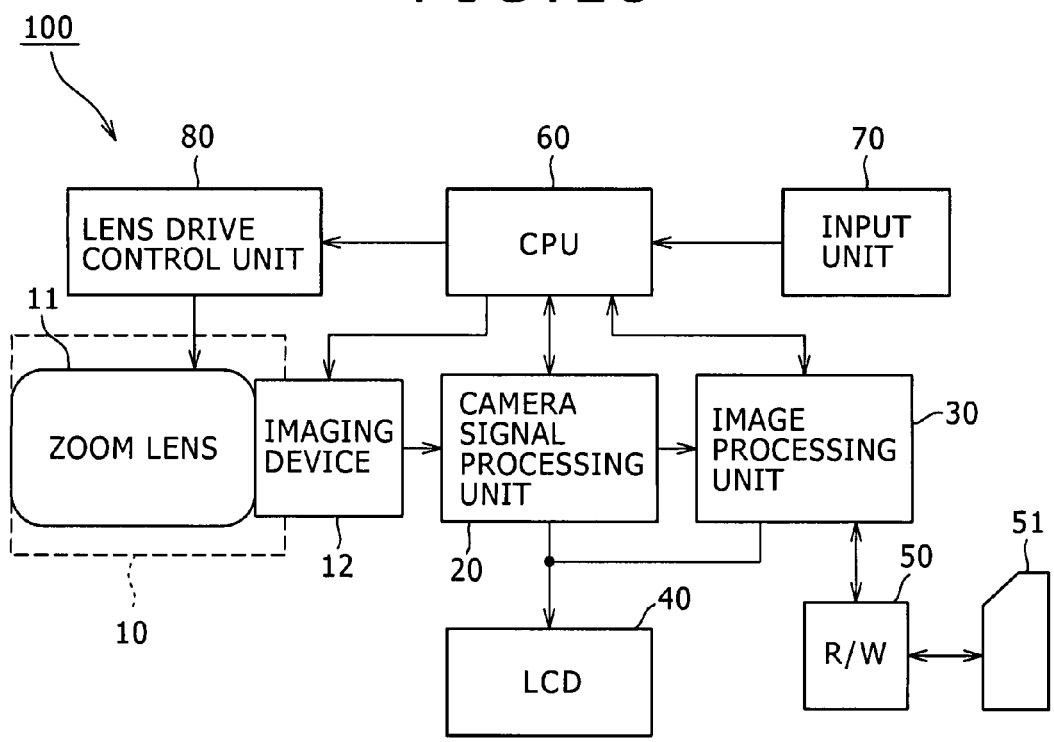
FIG. 25 is a circuit block diagram of an embodiment in which an image pick-up apparatus of the present invention is applied to a digital still camera.

FIGS. 22 to 24 are respectively aberration graphs showing a spherical aberration, astigmatism, and a distortion aberration of the Sixth Numerical Example. FIGS. 22 to 24 respectively show aberration graphs in the maximum wide angle state, the intermediate focal distance state, and the maximum telephoto state. In the spherical aberration of the respective aberration graphs of FIGS. 22 to 24, a solid line, a broken line, and a dash-and-dot line indicate values for the d-line, C-line, and g-line respectively. In the astigmatism graph and the distortion aberration graph, values are shown for the d-line. Further, in the astigmatism graph, a solid line shows values in a sagittal image plane and a broken line shows values in a meridional image plane.

It is clear from each aberration graph that the Sixth Numerical Example has an excellent image forming performance.

Next, the image pick-up apparatus of the present invention will be described.

The image pick-up apparatus of the present invention includes a zoom lens and an imaging device for converting an optical image formed by the zoom lens into an electric signal, in which the zoom lens is a zoom lens having a plurality of lens groups which performs zooming by changing a distance between groups, including a reflective member for bending an optical axis which passes through a plurality of abovementioned lens groups, wherein in order from an object side to an image plane side, a first lens group having a positive refractive power and fixed in position, a second lens group having a negative refractive power and moved along an optical axis direction when zooming, a third lens group having a positive refractive power and fixed in position, a fourth lens group having a positive refractive power and moved in an optical axis direction to compensate for position variations of the image plane when zooming and focusing, and a fifth lens group having a negative refractive power and fixed in position when zooming, and the image pick-up apparatus satisfies the following conditional expression (1).

$$3.4 < f3/fw < 4.0 \qquad (1)$$

where f3: focal distance of third lens group; and fw: focal distance at maximum wide angle state of whole lens system.

FIG. 24 is a block diagram showing an example of a structure of a digital still camera carrying a zoom lens according to an embodiment of the present invention.

A digital still camera 100 is provided with a lens block 10 which serves an image pick-up function, a camera signal processing unit 20 which performs signal processing, such as analog-to-digital conversion of a captured image signal, an image processing unit 30 which performs a process of recording and reproducing an image signal, an LCD (Liquid Crystal Display) 40 which displays the captured image etc., R/W (reader/writer) 50 which performs write/read into/from a memory card 51, a CPU (Central Processing Unit) 60 which controls the whole apparatus, an input unit 70 for receiving input operations by a user, and a lens drive control unit 80 which controls drive of a lens in the lens block 10.

The lens block 10 includes an optical system including a zoom lens 11 to which the present invention is applied, and an imaging device 12, such as CCD, etc. With respect to an output signal from the imaging device 12, the camera signal processing unit 20 performs signal processing, such as conversion into a digital signal, noise reduction, compensation for image quality and conversion into a luminosity and color difference signal. The image processing unit 30 performs compression coding and decompression decoding processes for an image signal based on a predetermined image data format, a conversion process for data formats, such as resolution, etc. It should be noted that the zoom lens 11 may employ any one of the zoom lenses 1 to 6 in accordance with the present invention and the Numeral Examples 1 to 6, or another zoom lens in accordance with another embodiment or another Numerical Example of the present invention.

The memory card 51 includes a detachable semiconductor memory. The reader/writer 50 writes the image data coded by the image processing unit 30 into the memory card 51, and reads the image data recorded in the memory card 51. The CPU 60 is a control processing unit for controlling each circuit block in the digital still camera, and controls each circuit block based on an instruction input signal from the input unit 70 etc.

The input unit 70 includes, for example, a shutter release button for performing shutter operation, a mode selection switch for selecting a mode of operation, etc., and outputs to the CPU 60 the instruction input signal according to operation by the user. The lens drive control unit 80 controls a motor etc. (not shown) for driving the lens in the zoom lens 11 based on a control signal from the CPU 60.

Hereafter, operation of the digital still camera 100 will be described briefly.

In a standby state of image pick-up, under control of the CPU 60, the image signal picked up in the lens block 10 is outputted to the LCD 40 through the camera signal processing unit 20, and is displayed as a camera through image. Further, when the instruction input signal for zooming from the input unit 70 is inputted, the CPU 60 outputs the control signal to the lens drive control unit 80, and a predetermined lens in the zoom lens 11 is moved under control of the lens drive control unit 80.

Further, if a shutter (not shown) of the lens block 10 is operated by the instruction input signal from the input unit 70, the captured image signal is outputted from the camera signal processing unit 20 to the image processing unit 30, subjected to a compression coding process, and converted into digital data in a predetermined data format. The converted data are outputted to the reader/writer 50, and written into the memory card 51.

It should be noted that, for example, in the case where the shutter release button is half depressed, fully depressed for recording, etc., the lens drive control unit 80 moves the predetermined lens in the zoom lens 11 based on the control signal from the CPU 60 so as to perform the focusing.

Further, in the case of reproducing the image data recorded on the memory card 51, predetermined image data are read out of the memory card 51 by the reader/writer 50 according to operation through the input unit 70, and subjected to the decompression decoding process in the image processing unit 30, then a reproduction image signal is outputted to the LCD 40, whereby a reproduction image is displayed.

Figure 26:
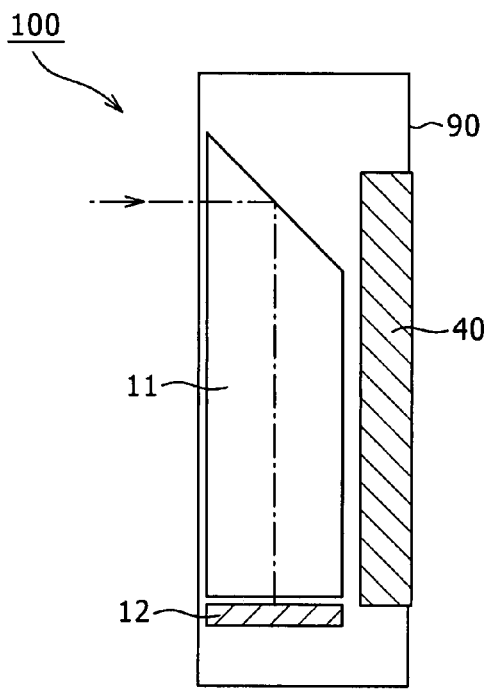
FIG. 26 is a schematic sectional view showing an example of an arrangement of components in a camera casing of the digital still camera.

FIG. 26 is a schematic sectional view showing an example of an arrangement of components in this digital still camera 100. It should be noted that FIG. 26 shows the inside of the digital still camera in the case where a photographic subject exists on the left-hand side in the drawing.

The zoom lens 11 is accommodated inside a camera casing 90, and the imaging device 12 is provided in the lower part. Further, the LCD 40 is provided at the camera casing 90 on a side facing towards the photographic subject, and is used for adjusting an angle of view at the time of taking an image, reproducing the image, confirming various setup data, etc.

The zoom lens 11 in accordance with the present invention can perform the zooming and the focusing by bending the optical axis of the light from the photographic subject by means of the prism, and moving the predetermined lens along the folded direction (up-down direction or right-left direction in the drawing). Therefore, it is possible to capture the image without causing the zoom lens 11 to project from the camera casing 90, and a depth of the camera body can be shortened at the time of capturing the image. In addition, it is possible to further miniaturize the camera casing 90 by designing the zoom lens 11 such that the above-described conditions are satisfied. Although it is small, it allows around 8 to 12 times zooming, and it is possible to obtain a high definition image with few aberrations at various focal distances.

The present document contains subject matter related to Japanese Patent Application No. 2006-329753 filed in the Japan Patent Office on Dec. 6, 2006, the entire content of which being incorporated herein by reference.

It should be noted that, in the above-described embodiments, although the examples are described in which the image pick-up apparatus of the present invention is applied to the digital still camera, it is also possible to apply it to other image pick-up apparatuses, such as for example a video camera.

Further, any one of the shapes of the parts and values as shown in each of the embodiments and the Numerical Examples shows only an example of implementing the present invention and the technical scope of the present invention should not be limitedly interpreted by these.

What is claimed is:

1. A zoom lens having a plurality of lens groups which performs zooming by changing distances between groups, comprising:

a reflective member to bend an optical axis which passes through the plurality of the lens groups, wherein the plurality of lens groups includes, in order from an object side to an image plane side, a first lens group having a positive refractive power and fixed in position, a second lens group having a negative refractive power and to be moved along the optical axis direction when zooming, a third lens group having a positive refractive power and fixed in position, a fourth lens group having a positive refractive power and to be moved in the optical axis direction to compensate a position change of the image plane when zooming and focusing, and a fifth lens group having a negative refractive power and fixed in position when zooming, and the zoom lens satisfies a following conditional expression (1);

$$3.4 < f3/fw < 4.0 \quad (1)$$

where
f3: focal distance of the third lens group; and
fw: focal distance at a maximum wide angle state of whole lens system.

2. The zoom lens according to claim 1, wherein
the fifth lens group includes at least one lens, at least one surface of which is an aspheric surface and which has a negative refractive power.

3. The zoom lens according to claim 1 or 2, wherein
the reflective member is provided in the first lens group.

4. The zoom lens according to claim 3, wherein
the reflective member is a rectangular prism having a refractive index of 1.9 or more.

5. The zoom lens according to claim 3, wherein
the first lens group comprises at least two lenses having positive refractive powers on the image side of the reflective member, and satisfies a following conditional expression (2):

$$Vave > 60 \tag{2}$$

where
Vave: average value of Abbe numbers of two lenses having positive refractive powers in the first lens group.

6. The zoom lens according to claim 1 or 2, wherein
the zoom lens satisfies a following conditional expression (3):

$$3.4 < f1/fw < 4.0 \tag{3}$$

where
f1: focal distance of first lens group.

7. The zoom lens according to claim 4, wherein
the first lens group comprises at least two lenses having positive refractive powers on the image side of the reflective member, and satisfies a following conditional expression (2);

$$Vave > 60 \tag{2}$$

where
Vave: average value of Abbe numbers of two lenses having positive refractive powers in the first lens group.

8. An image pick-up apparatus having a zoom lens and an imaging device converting an optical image formed by the zoom lens into an electric signal, in which the zoom lens is a zoom lens having a plurality of lens groups which performs zooming by changing distances between groups,
the zoom lens includes
a reflective member to bend an optical axis which passes through the plurality of the lens groups, wherein
the plurality of lens groups includes, in order from an object side to an image plane side,
a first lens group having a positive refractive power and fixed in position,
a second lens group having a negative refractive power and to be moved along the optical axis direction when zooming,
a third lens group having a positive refractive power and fixed in position,
a fourth lens group having a positive refractive power and to be moved in the optical axis direction to compensate a position change of the image plane when zooming and focusing, and
a fifth lens group having a negative refractive power and fixed in position when zooming, and
the zoom lens satisfies a following conditional expression (1);

$$3.4 < f3/fw < 4.0 \tag{1}$$

where
f3: focal distance of the third lens group; and
fw: focal distance at a maximum wide angle state of whole lens system.

9. The image pick-up apparatus according to claim 8, wherein
the fifth lens group of the zoom lens includes at least one lens, at least one surface of which is an aspheric surface and which has a negative refractive power.

* * * * *